US012310908B2

(12) United States Patent
Yoshimi et al.

(10) Patent No.: US 12,310,908 B2
(45) Date of Patent: May 27, 2025

(54) ASSIST DEVICE

(71) Applicant: JTEKT CORPORATION, Osaka (JP)

(72) Inventors: Yoshitaka Yoshimi, Kashiba (JP);
Toshiki Kumeno, Kyoto (JP)

(73) Assignee: JTEKT CORPORATION, Osaka (JP)

( * ) Notice: Subject to any disclaimer, the term of this patent is extended or adjusted under 35 U.S.C. 154(b) by 939 days.

(21) Appl. No.: 17/443,334

(22) Filed: Jul. 26, 2021

(65) Prior Publication Data

US 2022/0040025 A1 Feb. 10, 2022

(30) Foreign Application Priority Data

Aug. 6, 2020 (JP) .................. 2020-134085

(51) Int. Cl.
*A61H 1/02* (2006.01)
(52) U.S. Cl.
CPC ......... *A61H 1/0274* (2013.01); *A61H 1/0244* (2013.01); *A61H 2201/1215* (2013.01); *A61H 2201/1463* (2013.01); *A61H 2201/164* (2013.01); *A61H 2201/165* (2013.01); *A61H 2201/1671* (2013.01); *A61H 2201/5069* (2013.01); *A61H 2201/5084* (2013.01); *A61H 2230/625* (2013.01)
(58) Field of Classification Search
CPC ...... A61H 2201/1215; A61H 2201/164; A61H 2201/165; A61H 2201/1671; A61H 2201/5069; A61H 2201/5084; B25J 9/0006
See application file for complete search history.

(56) References Cited

U.S. PATENT DOCUMENTS 11,839,580 B2 * 12/2023 Ohta .................. A61H 1/00
2018/0272525 A1    9/2018 Kumeno et al.
2019/0009405 A1    1/2019 Ko et al.
(Continued)

FOREIGN PATENT DOCUMENTS

JP    2010-94147 A      4/2010
JP    2010094147 A  *   4/2010
JP    2018-199206 A    12/2018
(Continued)

OTHER PUBLICATIONS

Translation of JP2010/094147A (Takayuki) (Year: 2010).*
(Continued)

*Primary Examiner* — Christie Bahena
(74) *Attorney, Agent, or Firm* — Oblon, McClelland, Maier & Neustadt, L.L.P.

(57) ABSTRACT

An assist device includes a first body-worn unit, second body-worn units, an actuator, a detection part, a controller configured to obtain an assist parameter for causing the actuator to generate a desired assist force, and perform control for causing the actuator to operate at an output corresponding to the assist parameter. When the user performs a forward leaning action, the controller obtains the assist parameter for providing the user with the assist force in a direction of bringing the user to an upright standing posture based on the tilt angle and a time-based change in the tilt angle. The controller is configured to further perform an assistance moderation process to reduce the assist force when the time-based change in the tilt angle increases.

6 Claims, 16 Drawing Sheets

(56) References Cited

U.S. PATENT DOCUMENTS

2019/0358808 A1* 11/2019 Yoshimi ................. B25J 9/0006
2022/0000700 A1* 1/2022 Yoshimi ................... A61H 3/00

FOREIGN PATENT DOCUMENTS

| | | |
|---|---|---|
| JP | 2019-206044 A | 12/2019 |
| JP | 2019-206045 A | 12/2019 |
| WO | WO-2012171000 A1 * 12/2012 | ............... A61F 2/68 |

OTHER PUBLICATIONS

Japanese Office Action issued Feb. 13, 2024 in Japanese Patent Application No. 2020-134085 (with partial English translation), 8 pages.
U.S. Appl. No. 17/305,343 filed Jul. 6, 2021.
U.S. Appl. No. 17/305,188 filed on Jul. 1, 2021.

* cited by examiner

FIG. 10

| LEVEL | K  | d |
|-------|----|---|
| 0     | 0  | 0 |
| 1     | −3 | 1 |
| 2     | −7 | 2 |

ASSIST DEVICE

CROSS-REFERENCE TO RELATED APPLICATION

This application claims priority to Japanese Patent Application No. 2020-134085 filed on Aug. 6, 2020, incorporated herein by reference in its entirety.

BACKGROUND

1. Technical Field

This disclosure relates to an assist device.

2. Description of Related Art

Various assist devices that are worn on the bodies of users (persons) to assist the users in tasks have been proposed. For example, when lifting or lowering a heavy object, a user of an assist device can perform the task with a smaller force (with less burden). Among such assist devices, there is a known device that includes a first body-worn unit that is worn on the upper body of a user, right and left second body-worn units that are worn on the right and left legs of the user, and an actuator that provides the user with an assist force through the first body-worn unit and the second body-worn units (e.g., see Japanese Unexamined Patent Application Publication No. 2019-206044 (JP 2019-206044 A)).

SUMMARY

When lifting a load, the user changes his or her posture from a forward leaning posture to an upright standing posture. In this case, the assist device disclosed in JP 2019-206044 A generates an assist force (assist torque) in the direction of bringing the upper body that is in a forward leaning posture to an upright standing posture. When the user lowers a load, i.e., when the user places a load that the user is holding with hands onto a floor etc., the user changes his or her posture from an upright standing posture to a forward leaning posture. Also in this case, the assist device generates an assist force (assist torque) in the direction of bringing the upper body that is in a forward leaning posture to an upright standing posture. Thus, the assist device generates such an assist force that slows down (brakes) the action of the user leaning his or her upper body forward to lower the load.

It is preferable that the assist force generated by the assist device be varied according to, for example, the tilt angle of the upper body. For example, when the user leans his or her upper body forward to a large degree while holding a load, great burden is placed on his or her hips. It is therefore preferable that the assist device should generate a larger assist force when the forward leaning angle (tilt angle) of the upper body is large than when it is small. Thus, the burden on the hips of the user can be relieved more effectively.

To achieve this, the assist device disclosed in JP 2019-206044 A obtains an assist torque command value as an assist parameter for causing the actuator to generate a desired assist force and performs control for causing the actuator to operate at an output corresponding to the command value. When the user leans his or her upper body forward to a large degree, the assist device sets the command value to a large value.

As described above, when the user assumes a forward leaning posture, the assist device generates assist torque in the direction of bringing the upper body that is in a forward leaning posture to an upright standing posture. Thus, when the user leans his or her upper body forward to a large degree, temporarily stops this action, and then leans his or her upper body further forward, the assist torque command value that has been set to a large value makes it difficult for the user to assume a posture of leaning further forward. If the command value is set such that small assist torque is generated also when the tilt angle of the upper body is large, the user can easily assume a posture of leaning further forward after temporarily stopping the forward leaning action. In this case, however, the assist force may be insufficient, and thus, for example, the burden on the hips may be relieved less effectively.

This disclosure provides an assist device that can achieve both of increasing the assist force as the tilt angle of the upper body of the user increases when the user performs an action of leaning his or her upper body forward, and allowing the user to move easily when the user performs an action of leaning further forward from that state.

An assist device according to one aspect of this disclosure includes a first body-worn unit that is worn on an upper body of a user; right and left second body-worn units that are worn on right and left legs of the user; an actuator configured to provide the user with an assist force through the first body-worn unit and the second body-worn units; a detection part configured to detect a tilt angle of the upper body of the user; and a controller configured to obtain an assist parameter for causing the actuator to generate a desired assist force, and perform control for causing the actuator to operate at an output corresponding to the assist parameter. When the user performs a forward leaning action, the controller obtains the assist parameter for providing the user with the assist force in a direction of bringing the user to an upright standing posture based on the tilt angle and a time-based change in the tilt angle. The controller is configured to further perform an assistance moderation process to reduce the assist force when the time-based change in the tilt angle increases.

This assist device obtains the assist parameter using the tilt angle of the upper body of the user. Thus, this assist device can generate a larger assist force when the upper body leans forward to a large degree and the tilt angle is large than when the tilt angle is small. As a result, for example, the burden on the hips of the user can be relieved more effectively. Further, the assist parameter is obtained using not only the tilt angle of the upper body of the user but also the time-based change in the tilt angle. In particular, the process to reduce the assist force when the time-based change in the tilt angle increases is performed. Thus, in the case where the user leans the upper body forward to a relatively large degree, temporarily stops this action, and then leans the upper body further forward, when the upper body starts to move, the assist force can be reduced according to the time-based change in the tilt angle, so that the user can easily assume a posture of leaning further forward.

The controller may be configured to perform a first process to increase the assist force when the tilt angle increases, perform a second process, as the assistance moderation process, to reduce the assist force when the time-based change in the tilt angle increases, and obtain the assist parameter based on a result of the first process and a result of the second process.

In this configuration, when the user performs an action of lowering a load, for example, the assist force increases when the tilt angle of the upper body increases. When the user stops in a forward leaning posture at a predetermined tilt angle, the time-based change in the tilt angle becomes zero, and the forward leaning posture is maintained by a relatively large assist force to relieve the burden on the user. When the user starts an action of leaning further forward and the time-based change in the tilt angle increases, an assist parameter in the direction of reducing the assist force is obtained. Thus, the user can easily assume a forward leaning posture.

The controller may be configured to further perform, as the second process, a process of obtaining acceleration or deceleration of the forward leaning action of the user and making a rate of reducing the assist force larger when the acceleration is obtained than when the deceleration is obtained.

In this configuration, even when the time-based change in the tilt angle is the same in a forward leaning action of the user, the assist parameter that is obtained when the forward leaning action involves acceleration is different from the assist parameter that is obtained when it involves deceleration. Thus, when the forward leaning action involves acceleration, for example, when the user quickly lowers a relatively light load, the rate of reducing the assist force in the direction of bringing the user to an upright standing posture is increased, and thus, the user can perform the forward leaning action more easily. In contrast, when the forward leaning action involves deceleration, for example, when the user slowly lowers a heavy load, the rate of reducing the assist force in the direction of bringing the user to an upright standing posture is reduced, and thus, an appropriate assist force can be provided to the user.

As one configuration of the assist device, the actuator may include driving units that are mounted on the first body-worn unit so as to be located on right and left sides of hips of the user, and arms each of which has a leading end mounted on a corresponding one of the second body-worn units that are worn on thighs of the legs of the user and has a base end mounted on a corresponding one of the driving units, each of the arms being configured to swing back and forth around the base end. The actuator may be configured to, when the user changes a posture of the upper body in a forward leaning direction, provide the user with the assist force in a direction opposite to the forward leaning direction by generating torque on the arms around the base ends.

For example, when the user lowers a load, i.e., when the user places a load that the user is holding with hands onto a floor etc., the user changes the posture from an upright standing posture to a forward leaning posture. In the above configuration, the assist device can generate the assist force in the direction of bringing the upper body that is in a forward leaning posture to an upright standing posture. In other words, the assist device can generate such an assist force that slows down the action of the user leaning the upper body forward.

As another configuration of the assist device, the actuator may include a reeling unit including a drum and a motor that rotates the drum, the reeling unit being mounted on the first body-worn unit, and a belt body that has a first end wound around the drum and second ends mounted on the second body-worn units. The actuator may be configured to generate, by the motor, torque in a direction in which the drum reels a part of the belt body. The actuator may be configured to, when the user changes a posture of the upper body in a forward leaning direction, reel out the belt body from the drum while generating the torque in the direction in which the belt body is reeled onto the drum.

For example, when the user lowers a load, i.e., when the user places a load that the user is holding with hands onto a floor etc., the user changes the posture from an upright standing posture to a forward leaning posture. In the above configuration, the assist device can generate the assist force in the direction of bringing the upper body that is in a forward leaning posture to an upright standing posture. In other words, the assist device can generate such an assist force that slows down the action of the user leaning his or her upper body forward.

The assist device of this disclosure according to the above aspect can achieve both of increasing the assist force when the tilt angle of the upper body of the user increases in the case where the user performs an action of leaning the upper body forward, and allowing the user to move easily in the case where the user performs an action of leaning further forward from that state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is an illustration showing one example of a virtual spring constant and a damper constant;

DETAILED DESCRIPTION OF EMBODIMENTS

Overall Structure of Assist Device

Figure 1:
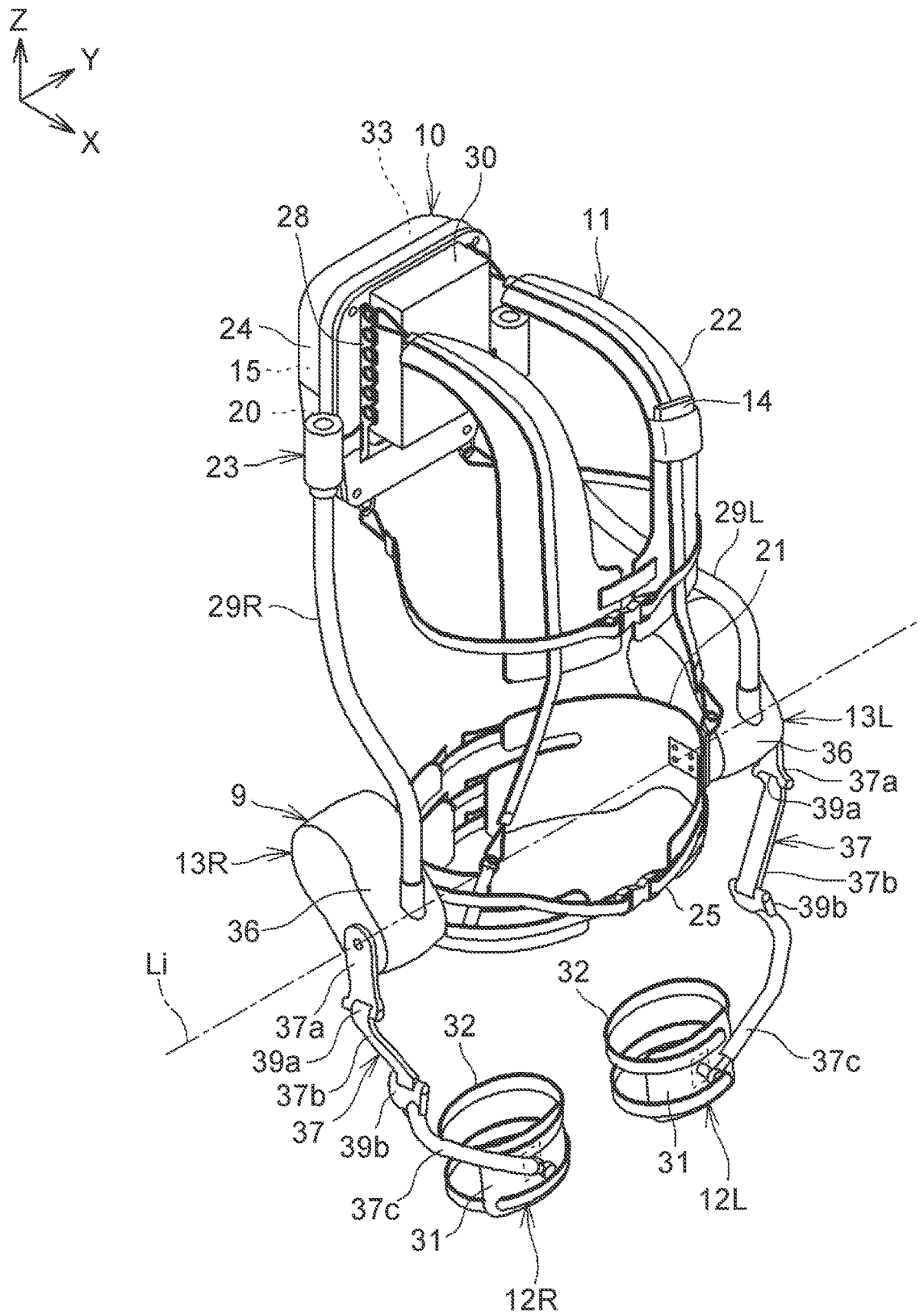
FIG. 1 is a perspective view showing the overall configuration of one example of an assist device.
Figure 2:
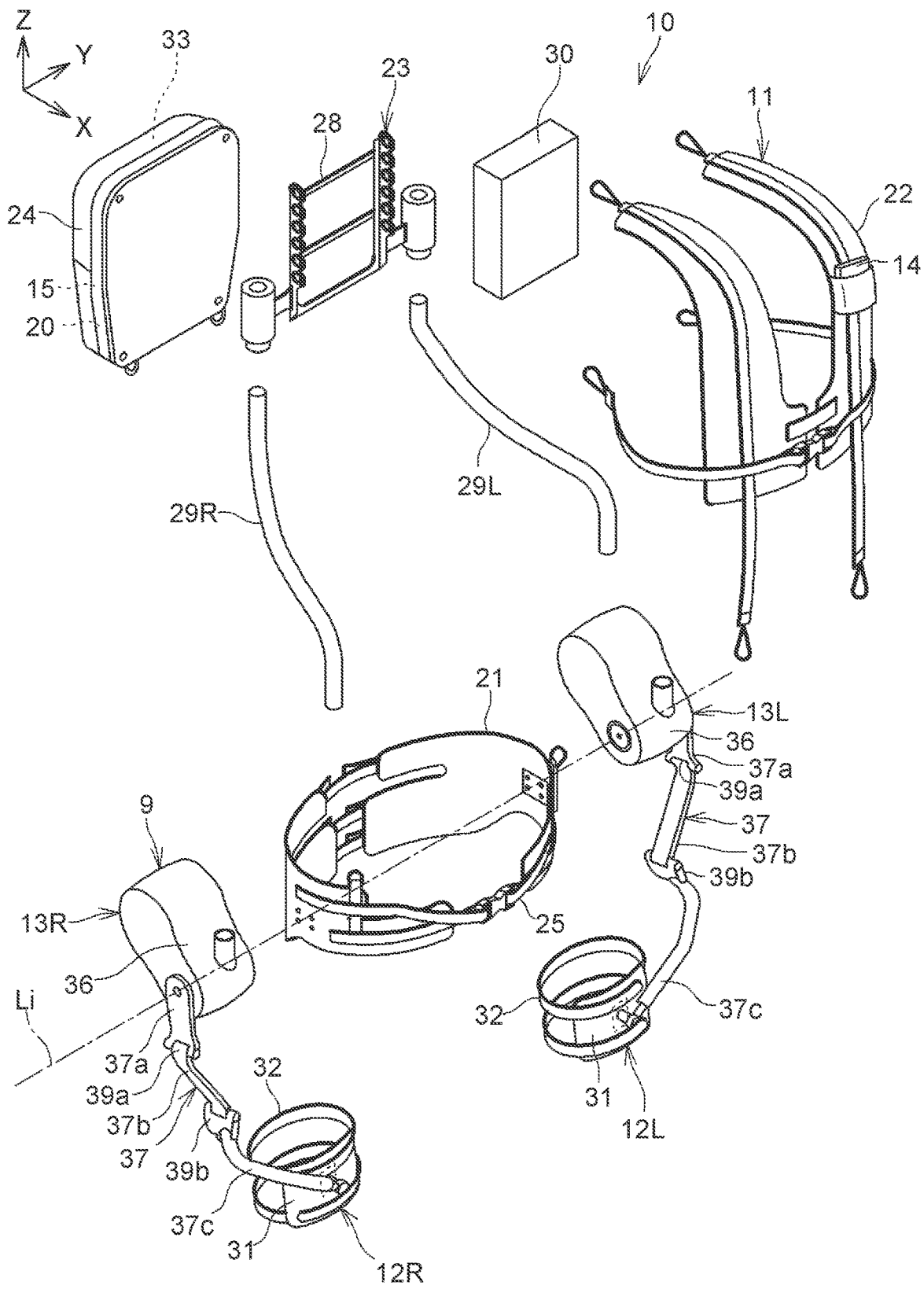
FIG. 2 is an exploded perspective view of the assist device shown in FIG. 1.
Figure 3:
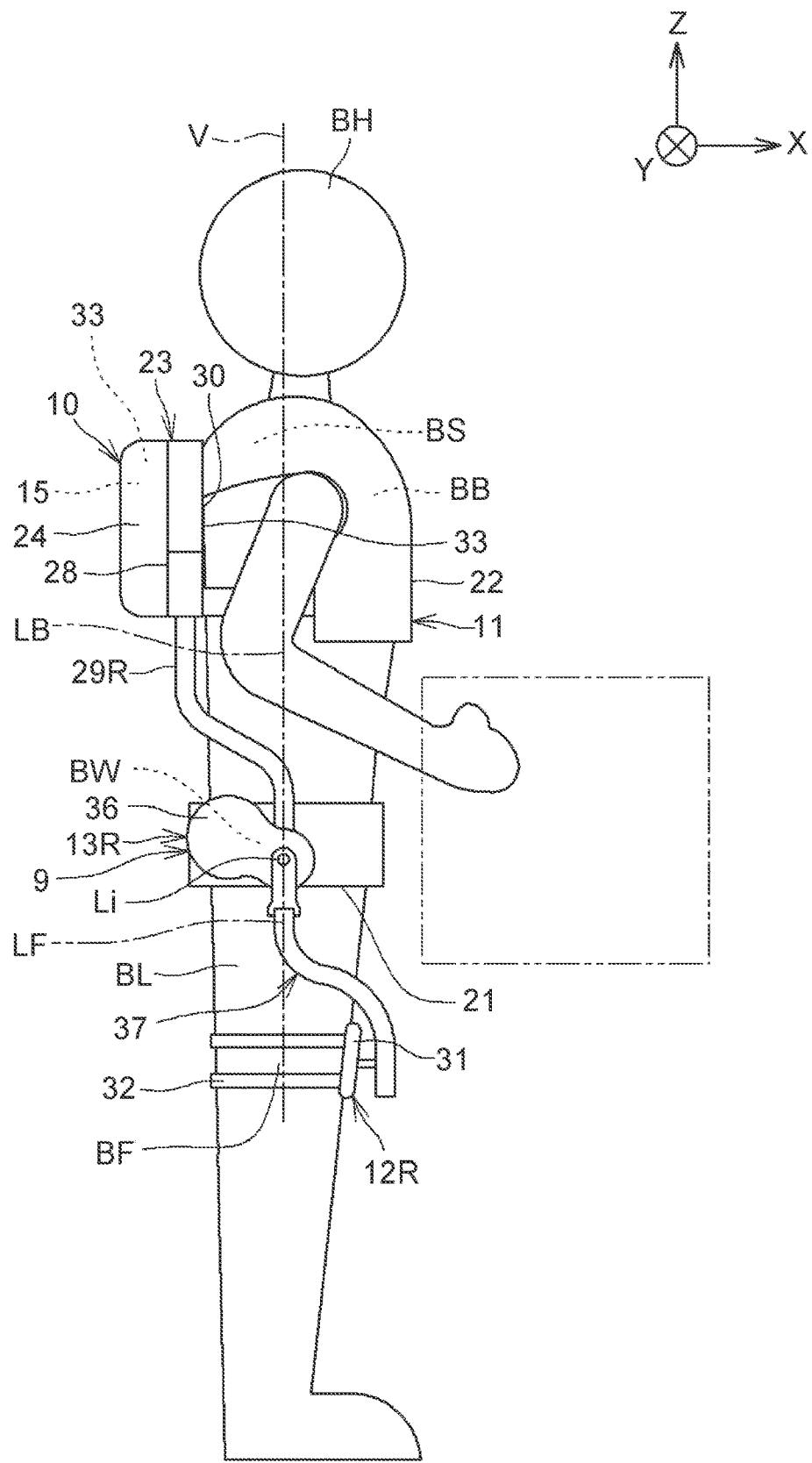
FIG. 3 is a side view showing a user wearing the assist device shown in FIG. 1.
Figure 4:
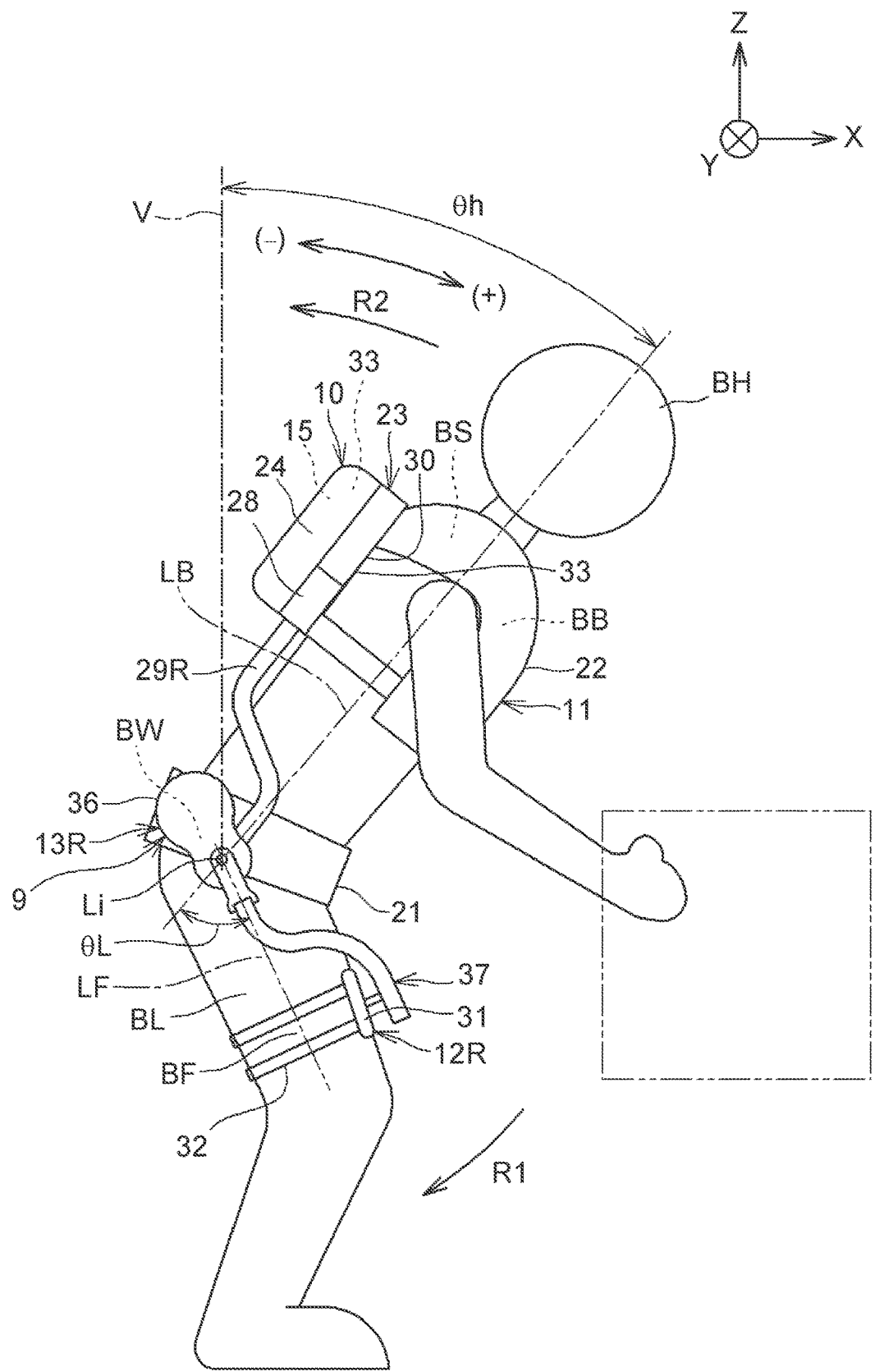
FIG. 4 is a side view showing the user wearing the assist device shown in FIG. 1.

FIG. 1 is a perspective view showing the overall configuration of one example of an assist device. FIG. 2 is an exploded perspective view of the assist device shown in FIG. 1. FIG. 3 and FIG. 4 are side views showing a user wearing the assist device shown in FIG. 1. In FIG. 3, the user is in an upright standing posture, and in FIG. 4, the user is in a forward leaning posture. The upright standing posture shown in FIG. 3 is a posture in which a longitudinal direction of the body of the user from his or her leg BL to his or her head BH is along a vertical line V. The forward leaning posture shown in FIG. 4 is a posture in which a longitudinal direction of the upper body of the user tilts toward a front side relatively to the vertical line V. The upper body is the part from the hips BW to the head BH. The forward leaning posture shown in FIG. 4 is a posture of the user in a state of having bent his or her legs BL at the knees. In FIG. 4, the angle of the forward leaning posture of the upper body of the user relative to the vertical line V is denoted by θh. The angle θh represents a "tilt angle θh" of the upper body of the user with respect to the vertical line V.

An assist device 10 is a device that assists a user in turning his or her legs BL (thighs BF) relatively to his or her hips BW, for example, when the user lifts a load and lowers a load, and assists the user in turning his or her legs BL (thighs BF) relatively to his or her hips BW when the user walks. Operation of the assist device 10 providing the user with physical assistance will be referred to as "assist operation."

The X-axis, Y-axis, and Z-axis in the drawings are orthogonal to one another. For the user who is wearing the assist device 10 in an upright standing posture, an X-axis direction, a Y-axis direction, and a Z-axis direction correspond to a frontward direction, a leftward direction, and an upward direction, respectively. With regard to assist operation, assisting the user in turning his or her legs BL (thighs BF) relatively to his or her hips BW as mentioned above is the same as assisting the user in turning his or her hips BW relatively to his or her legs BL (thighs BF). Assist operation in this embodiment is operation of assisting the user by providing the user with torque around an imaginary line Li that passes through the user near his or her hips BW in a right-left direction. This torque will be also referred to as "assist torque."

The assist device 10 shown in FIG. 1 includes a first body-worn unit 11, right and left second body-worn units 12R, 12L, and an actuator 9 that generates assist torque for assisting the user in moving his or her hips BW relatively to his or her thighs BF and vice versa. "Moving his or her hips BW relatively to his or her thighs BF and vice versa" means moving his or her thighs BF relatively to his or her hips BW and moving his or her hips BW relatively to his or her thighs BF. In the form shown in FIG. 1, the actuator 9 includes right and left driving units 13R, 13L, and arms 37 that are respectively mounted on the driving units 13R, 13L.

The first body-worn unit 11 includes a hip support 21 and a jacket 22 and is worn on the upper body of the user including at least his or her hips BW. The right and left second body-worn units 12R, 12L are worn on the thighs BF of the right and left legs BL of the user. The right and left driving units 13R, 13L are interposed between the first body-worn unit 11 and the second body-worn units 12R, 12L and serve as driving parts that perform driving operation to perform assist operation.

The assist device 10 further includes an operation unit 14 and a control device 15. The operation unit 14 is a so-called controller and is a device into which the user inputs specifications of assist operation etc. The specifications of assist operation include an action mode of assist operation, the intensity of assist operation, and the speed of assist operation. Action modes include, for example, "lowering action" and "lifting action." The action modes may further include "walking." The intensity of assist operation is set in multiple levels. For example, "level 1 (low)," "level 2 (medium)," and "level 3 (high)" are set. The operation unit 14 is provided with selection buttons by which the user selects the specifications of assist operation. The operation unit 14 and the control device 15 are connected to each other via wire or wirelessly and can communicate with each other. The control device 15 controls the operation of the driving units 13R, 13L according to the information input into the operation unit 14.

The first body-worn unit 11 includes the hip support 21, the jacket 22, a frame 23, and a backpack 24. The hip support 21 is worn around the hips BW of the user. The hip support 21 includes a belt 25. The belt 25 allows the length of the hip support 21 around the hips BW to be changed and is used to fix the hip support 21 to the hips BW. The hip support 21 includes a hard core made of resin or the like and a leather or fabric member. Cases 36 of the driving units 13R, 13L are mounted on right and left sides of the hip support 21. The hip support 21 and the cases 36 are mounted so as to be able to turn in one direction and the other direction around the imaginary line Li extending in the right-left direction. The jacket 22 is worn around the shoulders BS and the chest BB of the user. The jacket 22 includes a hard core made of resin or the like and a leather or fabric member. The jacket 22 is coupled to the frame 23 and the hip support 21.

The frame 23 is formed by a member made of metal, such as aluminum alloy. The frame 23 includes a main frame 28, a left sub-frame 29L, and a right sub-frame 29R. The main frame 28 includes a support member 30 on which the back of the user rests. The right sub-frame 29R and the left sub-frame 29L are columnar members that connect the main frame 28 and parts of the right and left driving units 13R, 13L to each other. Thus, the right and left driving units 13R, 13L and the frame 23 of the first body-worn unit 11 are integrated, and thus, the right and left driving units 13R, 13L and the frame 23 (first body-worn unit 11) cannot shift relatively to each other.

The backpack 24 is mounted at a back part of the main frame 28. The backpack 24 is also called a control box and has a box shape, and inside the backpack 24, the control device 15, a power source (battery) 20, an acceleration sensor 33, and others are provided. The power source 20 supplies required electricity to pieces of equipment including the control device 15 and the right and left driving units 13R, 13L.

The right and left second body-worn units 12R, 12L are worn around the right and left thighs BF of the user. The shape of the second body-worn unit 12L for the left thigh BF and the shape of the second body-worn unit 12R for the right thigh BF are mirror images of each other, but both units have the same configuration. The second body-worn unit 12L (12R) includes a pad-like main part 31 formed by a hard core made of metal, resin, or the like and a belt 32 formed by a leather or fabric member. A part of the arm 37 of the driving unit 13L is coupled to the main part 31. The main part 31 comes into contact with a front surface of the thigh BF. The belt 32 allows the length of the second body-worn unit 12R (12L) around the thigh BF to be changed and is used to fix the main part 31 to the thigh BF.

The right and left driving units 13R, 13L are mounted on the first body-worn unit 11 so as to be located on right and left sides of the hips BW of the user. Specifically, the driving units 13R, 13L are mounted on the right and left sides of the hip support 21. The shape of the left driving unit 13L and the shape of the right driving unit 13R are mirror images of each other, but both units have the same configuration and the same function. The left driving unit 13L and the right driving unit 13R can each operate independently of the other and perform a different operation, as well as can synchronously perform the same operation.

Each of the right and left driving units 13R, 13L has a configuration for performing assist operation of providing the user with an assist force. The assist force is a force based on torque around the imaginary line Li, and this torque is "assist torque." The assist device 10 assists the user in turning his or her thighs BF relatively to his or her hips BW with assist torque output by the right and left driving units 13R, 13L.

Figure 5:
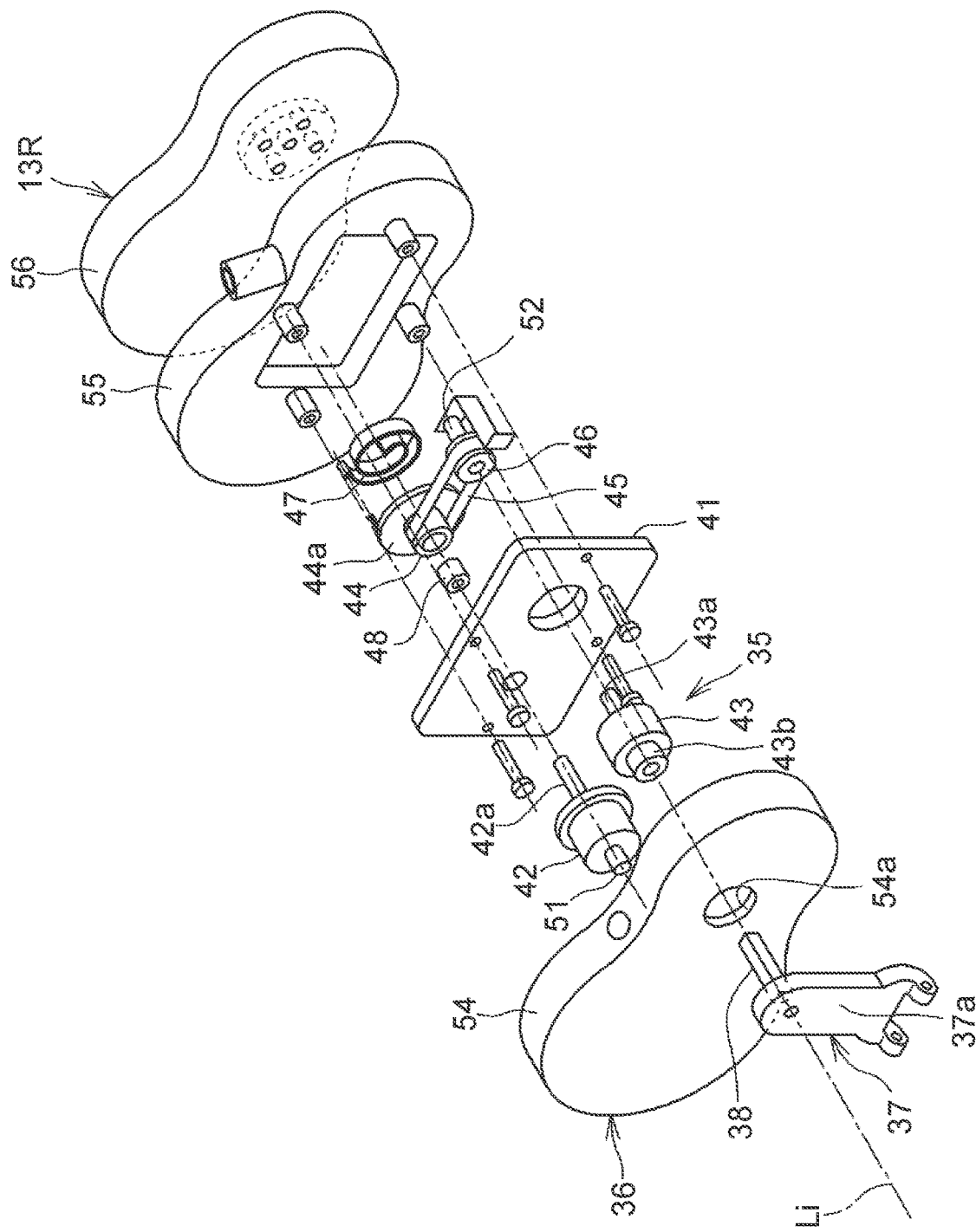
FIG. 5 is an exploded view of a right actuator.
Figure 6:
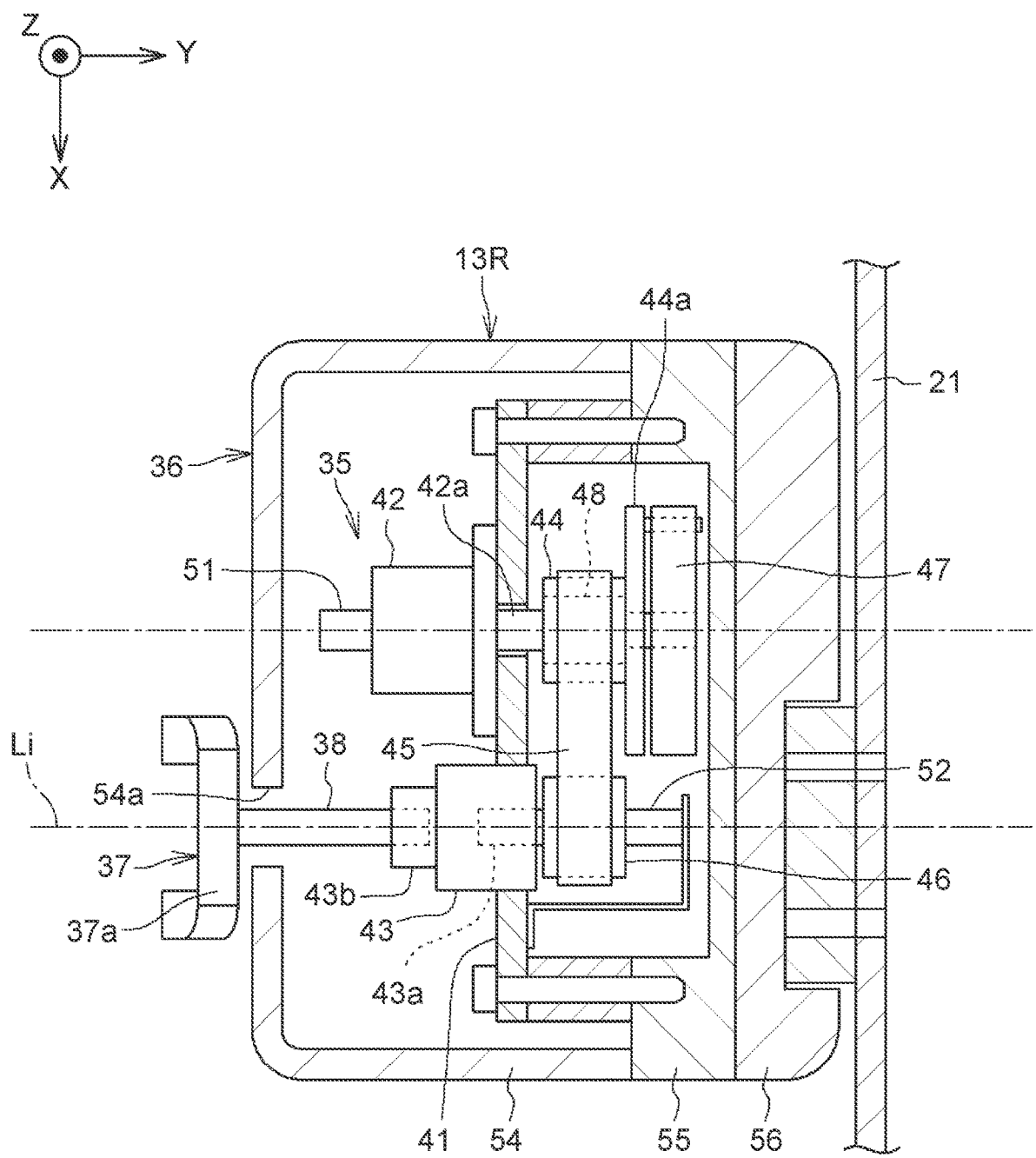
FIG. 6 is a sectional view of the right actuator.

FIG. 5 is an exploded view of the right driving unit 13R. FIG. 6 is a sectional view of the right driving unit 13R. Since the left driving unit 13L and the right driving unit 13R have the same configuration, the configuration of the right driving unit 13R will be described and the description of the left driving unit 13L will be omitted here. The driving unit 13R includes a driving mechanism 35 and the case 36 that houses the driving mechanism 35. Torque output from the driving mechanism 35 is transmitted to the arm 37. In FIG. 5 and FIG. 6, only a part (first arm part 37a) of the arm 37 is shown.

An assist shaft 38 is fixed at an upper end of the arm 37 (first arm part 37a), and the arm 37 and the assist shaft 38 rotate integrally. The assist shaft 38 is provided in the driving unit 13R so as to be centered on the imaginary line Li. As shown in FIG. 1, a leading end of the arm 37 (third arm part 37c) is coupled to the second body-worn unit 12R.

The driving mechanism 35 is configured as follows. The driving mechanism 35 provides the user with assist torque by swinging (turning) the arm 37 around the imaginary line Li. When the user voluntarily changes his or her posture (see FIG. 3 and FIG. 4), the arm 37 swings (turns) around the imaginary line Li relatively to the case 36.

The specific configuration of the driving mechanism 35 will be described. As shown in FIG. 5 and FIG. 6, the driving mechanism 35 includes a sub-frame 41 that is fixed on the case 36, a motor 42, a speed reducer 43, a first pulley 44 having a flange 44a, a transmission belt 45, a second pulley 46, a spiral spring 47, a bearing 48, a first detector 51, and a second detector 52. The motor 42, the speed reducer 43, and the second detector 52 are mounted on the sub-frame 41. The first pulley 44 is mounted on an output shaft 42a of the motor 42 through the bearing 48, and the first pulley 44 can rotate relatively to the output shaft 42a. An inner peripheral end of the spiral spring 47 is mounted on a leading part of the output shaft 42a. An outer peripheral end of the spiral spring 47 is mounted on the flange 44a of the first pulley 44. The assist shaft 38 is fixed on a speed reducing shaft 43b of the speed reducer 43. The second pulley 46 is mounted on a speed increasing shaft 43a of the speed reducer 43. The transmission belt 45 is wrapped around the first pulley 44 and the second pulley 46. Central axes of the assist shaft 38, the speed reducer 43, and the second pulley 46 coincide with the imaginary line Li.

The case 36 has a split structure. The case 36 includes an outer case 54, a middle case 55, and an inner case 56. The inner case 56 is mounted on the hip support 21 so as to be turnable around the imaginary line Li. The assist shaft 38 is disposed so as to extend through a hole 54a provided in the outer case 54.

The first detector 51 detects the rotation angle of the output shaft 42a of the motor 42. The second detector 52 directly detects the rotation angle of the second pulley 46. Since the reduction ratio of the speed reducer 43 is constant, the second detector 52 can detect the turning angle of the assist shaft 38. The turning angle of the assist shaft 38 and the swing angle (turning angle) of the arm 37 are the same, and therefore the second detector 52 can detect the swing angle of the arm 37.

In the upright standing posture shown in FIG. 3, a straight line LB in the longitudinal direction of the upper body of the user and a straight line LF in the longitudinal direction of the thigh BF of the user extend along the common vertical line V. As shown in FIG. 4, in the posture in which the user leans forward with his or her knees bent, the straight line LB tilts relatively to the vertical line V, and the angle of this tilt is the "tilt angle θh." The straight line LB in the longitudinal direction of the upper body of the user and the straight line LF in the longitudinal direction of the thigh BF of the user intersect with each other at an angle θL. Since the arm 37 is provided along the thigh BF of the user, the angle formed by the upper body and the thigh BF of the user is the same as the swing angle of the arm 37. In other words, the angle θL represents the tilt angle of the upper body with respect to the thigh BF.

Thus, the second detector 52 can function as a detection part that detects the tilt angle (θL) of the upper body of the user with respect to the thigh BF of the user. Hereinafter, as the tilt angle of the upper body of the user, the angle (θh) of the upper body with respect to the vertical line V may be used, or the angle (θL) of the upper body with respect to the thigh BF may be used. The tilt angles (θh, θL) may be based on a state at a time point when the assist device 10 starts assist operation.

The second detector 52 of the driving unit 13R shown in FIG. 5 can obtain swing angle information on the swing angle θL of the arm 37 with respect to the straight line LB in the longitudinal direction of the upper body of the user. The second detector 52 functions as a swing angle detection part that obtains the swing angle information on the swing angle θL of the arm 37. Since the swing angle θL of the arm 37 corresponds to the rotation angle (swing angle) of the femur relative to the pelvis, the swing angle θL of the arm 37 can be called not only the tilt angle of the upper body of the user but also the rotation angle of the hip joint of the user.

The first detector 51 and the second detector 52 are formed by encoders, angle sensors, or the like. The first detector 51 and the second detector 52 are provided in each of the driving units 13R, 13L and function as detectors for the thigh BF of the right leg and detectors for the thigh BF of the left leg. Detection results of the first detectors 51 and the second detectors 52 are output to the control device 15. The detection result of each first detector 51 should be rotation angle information on the rotation angle of the output shaft 42a, and in this embodiment, this information is the rotation angle itself. The detection result of each second detector 52 should be swing angle information on the swing angle of the arm 37, and in this embodiment, this information is the swing angle θL itself.

As described above (see FIG. 1), the frame 23 of the first body-worn unit 11 and the right and left driving units 13R, 13L are integrated and cannot shift relatively to each other. When the user changes his or her posture (see FIG. 3 and FIG. 4), the right and left arms 37 turn around the imaginary line Li relatively to the cases 36 of the right and left driving units 13R, 13L. Thus, when the user changes his or her posture, torque is applied to the arms 37. This torque is transmitted from each arm 37 to the second pulley 46 through the assist shaft 38 and the speed reducer 43. The torque transmitted to the second pulley 46 is transmitted to the spiral spring 47 through the transmission belt 45 and the first pulley 44. The torque that is transmitted from the arm 37 through the assist shaft 38 as a result of a change in the posture of the user is accumulated in the spiral spring 47.

When the motor 42 rotates, torque of the motor 42 (motor torque) is accumulated in the spiral spring 47. Thus, in the spiral spring 47, the torque of the motor 42 as well as the user's torque transmitted by an action of the user are accumulated. Combined torque combining the assist torque and the user's torque is accumulated in the spiral spring 47. The combined torque accumulated in the spiral spring 47 is output to the assist shaft 38 through the first pulley 44, the transmission belt 45, the second pulley 46, and the speed reducer 43, and swings the arm 37. Torque that the driving units 13R, 13L output with the use of the torque of the motor 42 is "assist torque" provided by the assist device 10. As will be described later, a command value for assist torque output by the driving units 13R, 13L is obtained by the control device 15, and the actuator 9 is operated at an output corresponding to this assist torque command value.

The combined torque is obtained based on an amount of change in the angle of the spiral spring 47 from a no-load state and the spring constant of the spiral spring 47. The amount of change in the angle is correlated with the sum of an amount of change in the rotation angle of the output shaft 42a of the motor 42 and an amount of change in the rotation angle of the assist shaft 38. Therefore, the combined torque is obtained based on a detection result of the first detector 51, a detection result of the second detector 52, and the spring constant of the spiral spring 47. As the detection results of the first detector 51 and the second detector 52 are provided to a processing unit 16 included in the control device 15, the processing unit 16 can obtain the combined torque.

As shown in FIG. 1 and FIG. 2, each arm 37 includes a plurality of arm parts and joints that couple these arm parts together. In this disclosure, each arm 37 includes the first arm part 37a, a second arm part 37b, the third arm part 37c, a first joint 39a, and a second joint 39b. The arm 37 includes the joints 39a, 39b but can transmit torque around the imaginary line Li to the second body-worn unit 12R (12L). When the user changes his or her posture (see FIG. 3 and FIG. 4), the second body-worn unit 12R (12L) is pressed by the thigh BF and the arm 37 swings around the imaginary line Li. Thus, the arm 37 can transmit a force that an action (a change in the posture) of the user exerts on the second body-worn unit 12R (12L) to the assist shaft 38 as torque around the imaginary line Li. The arm 37 may have a form different from that shown in the drawings.

The assist device 10 further includes a detection part that detects a tilt angle of the upper body of the user that is an upper part of the user's body including his or her hips BW. The detection part in this embodiment is a triaxial acceleration sensor 33. The acceleration sensor 33 is provided, for example, in the backpack 24. The tilt angle of the upper body of the user detected by the acceleration sensor 33 is the tilt angle of the upper body of the user with respect to the vertical line V when the upper body of the user tilts toward the front side, and in this disclosure (see FIG. 4), this tilt angle is denoted by "θh" as described above. The detection part may have another form as long as it is configured to, like the triaxial acceleration sensor 33, output a signal corresponding to the posture (tilt angle) of the upper body of the user.

As described above, the tilt angle of the upper body with respect to the thigh BF is detected by the second detector 52. While the detection part that detects the tilt angle of the upper body may be the second detector 52, in this embodiment, a case where this detection part is the triaxial acceleration sensor 33 will be described.

Figure 7:
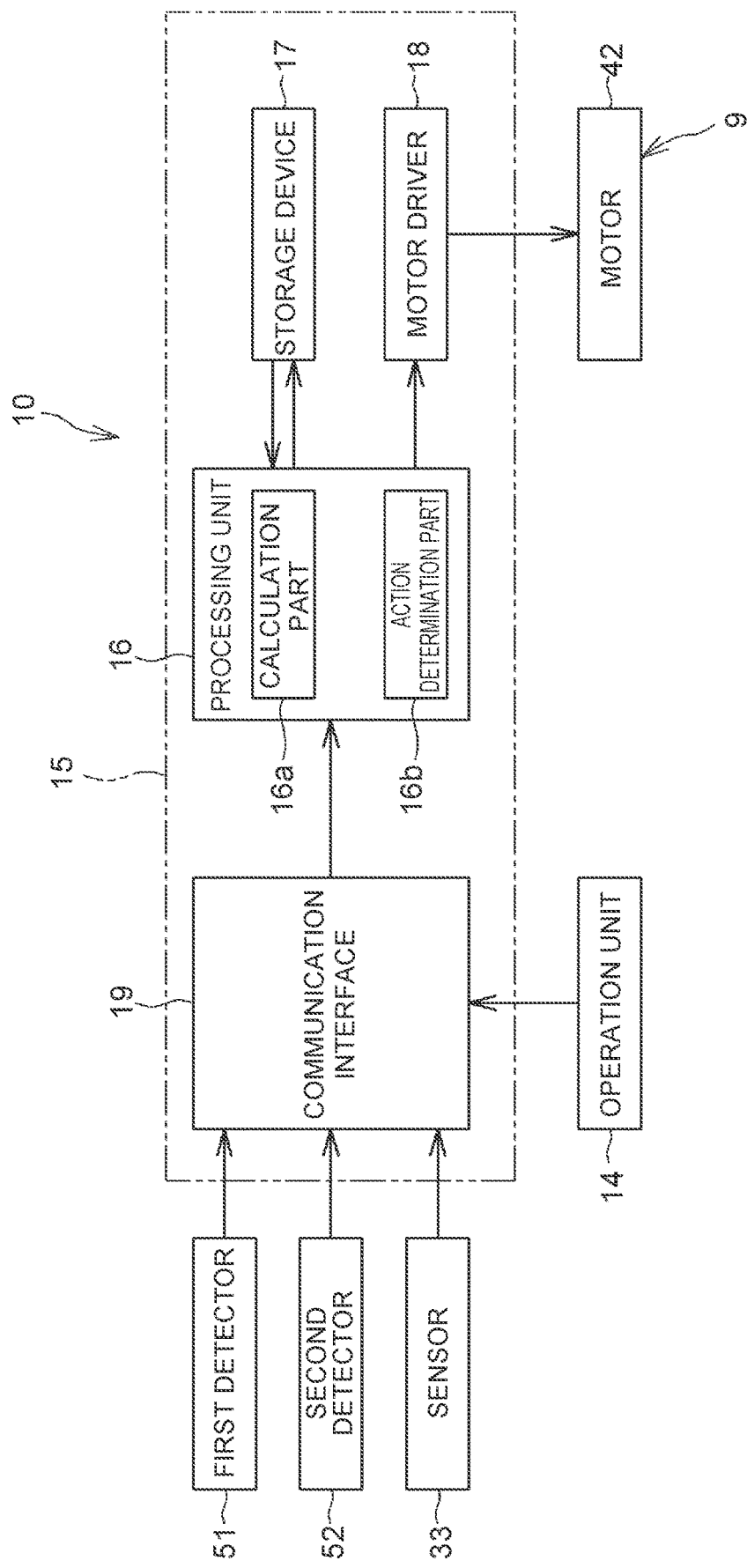
FIG. 7 is a block diagram showing a control device etc. included in the assist device.

FIG. 7 is a block diagram showing the control device 15 etc. included in the assist device 10. The control device 15 obtains an assist torque command value as an assist parameter that determines an assist force (assist torque) to be generated, and performs control for causing the actuator 9 to operate at an output based on the command value. The assist parameter may be any parameter that determines assist torque to be generated, and a parameter other than torque, for example, an assist force, may be used as the assist parameter.

To obtain the assist torque command value and control the actuator 9, the control device 15 includes the processing unit (processing device) 16 including a central processing unit (CPU), a storage device 17 formed by a non-volatile memory or the like that stores information, such as various programs and databases, a motor driver 18, and a communication interface 19.

The processing unit 16 can have various functions by executing computer programs stored in the storage device 17. The processing unit 16 functions to obtain an assist torque command value as the assist parameter and to provide commands for performing assist operation with the use of the driving units 13R, 13L. Specifically, as functional parts that operate in accordance with computer programs stored in the storage device 17, the processing unit 16 includes a calculation part 16a that obtains an assist torque command value, and an action determination part 16b that determines the action of the user (action mode). The action determination part 16b automatically determines the action of the user based on a detection result of one or both of the triaxial acceleration sensor 33 and the second detectors 52.

The function of giving commands for performing assist operation with the use of the driving units 13R, 13L will be described. For example, when a selection button of the operation unit 14 (see FIG. 7) is selected by the user, the processing unit 16 performs assist operation in accordance with a program for the action corresponding to that selection button. The processing unit 16 functions to perform assist operation for a "lowering action," a "lifting action," etc. in accordance with programs stored in the storage device 17. The processing unit 16 functions to, when detecting "walking" as the action mode, perform assist operation for "walking" in accordance with a program stored in the storage device 17. As the programs, a walking program, a lifting program, and a lowering program are stored in the storage device 17. For example, when a button in the operation unit 14 corresponding to a "lowering action" is selected by the user's operation, the processing unit 16 performs assist operation for a lowering action in accordance with the lowering program.

In the case where the assist device 10 provides assistance for each action of "walking," a "lifting action," and a "lowering action," the processing unit 16 obtains a command value for the required assist torque, and generates a command signal that causes the driving units 13R, 13L to output assist torque corresponding to that command value. This command signal is provided to the motor driver 18. The motor driver 18 is configured to include an electronic circuit, for example, and outputs a driving current for driving the motor 42 based on the command signal from the processing unit 16. The motor driver 18 activates the driving units 13R, 13L based on the command signal. The motor driver 18 functions as an activation control part that activates the driving units 13R, 13L based on the signal (command signal) corresponding to the assist torque command value.

Signals from each of the operation unit 14, the first detectors 51, the second detectors 52, and the acceleration sensor 33 are input into the communication interface 19, which then provides these signals to the processing unit 16. Information input into the operation unit 14, such as the specifications of assist operation, is input into the processing unit 16 through the communication interface 19, and the processing unit 16 performs processes using the input information.

Overview of Assist Operation

As described above, the assist device 10 performs assist operation using the arms 37 by operating the right and left driving units 13R, 13L. Assist operation is operation of providing assist torque around the imaginary line Li passing through the user near his or her hips BW in the right-left direction to the user through the first body-worn unit 11 and the second body-worn units 12R, 12L.

Examples of actions of the user include a lifting action (also called an "upright standing action") in which the user changes the posture of his or her upper body from a forward leaning posture to an upright standing posture to lift a load; a lowering action (also called a "forward leaning action") in which the user changes the posture of his or her upper body from an upright standing posture to a forward leaning posture to lower a load; and an action in which the user walks.

Regardless of whether the user performs a lifting action or a lowering action, assist torque generated by the assist device 10 is torque in a direction of changing the posture of the user from a forward leaning posture to an upright standing posture. That is, the direction in which the right and left driving units 13R, 13L try to turn (swing) the arms 37 around the imaginary line Li (see FIG. 4) is the direction of arrow R1, and the direction in which the right and left driving units 13R, 13L try to turn the first body-worn unit 11 (frame 23) around the imaginary line Li is the direction of arrow R2.

When the user performs a lifting action or a lowering action, the pad-like main parts 31 of the right and left second body-worn units 12R, 12L push the right and left thighs BF backward by assist torque in the direction of arrow R1. The frame 23 of the first body-worn unit 11 pulls the upper body of the user toward the back side (backward) by assist torque in the direction of arrow R2. In the case of a lifting action, the user changes his or her posture to an upright standing posture along the aforementioned direction in which the assist torque acts. In the case of a lowering action, the user changes his or her posture to a forward leaning posture in the direction opposite to the aforementioned direction in which the assist torque acts. Thus, the assist device 10 generates assist torque as an assist force that slows down (brakes) the action of the user leaning his or her upper body forward to lower a load. Also when the user stops in a forward leaning posture, this posture is maintained by the assist torque that is being generated and the burden on his or her body is relieved.

When the assist device 10 performs assist operation for walking on the user, this assist operation is operation of assisting the user in turning his or her thighs BF relatively to his or her hips BW, and the right and left driving units 13R, 13L alternately perform the operation to assist turning. Thus, the right and left driving units 13R, 13L alternately swing the right and left arms 37 at predetermined assist torque.

Processes Performed by Control Device 15

The command value for assist torque that is output by the driving units 13R, 13L for the assist device 10 configured as described above to perform assist operation is determined by the calculation part 16a of the processing unit 16. Assist torque that the actuator 9 provides to the user is based on the output torque of the motor 42. To increase the assist torque provided to the user, the output torque of the motor 42 should be increased, and to reduce the assist torque provided to the user, the output torque of the motor 42 should be reduced. The assist torque command value is obtained based on various pieces of information obtained from detection parts that include the acceleration sensor 33, and that detect the tilt angle of the upper body of the user.

Figure 8:
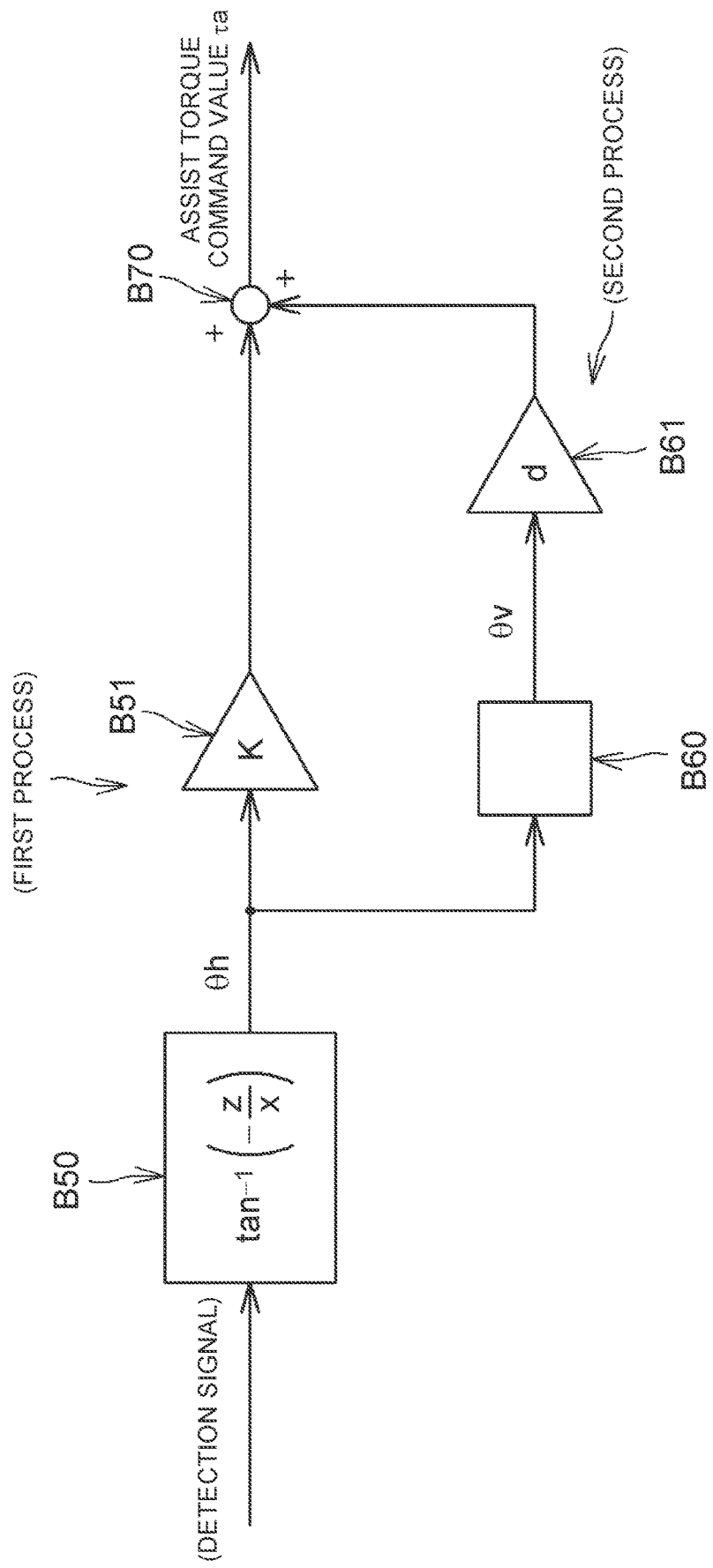
FIG. 8 is a block diagram showing part of a lowering action process.
Figure 9:
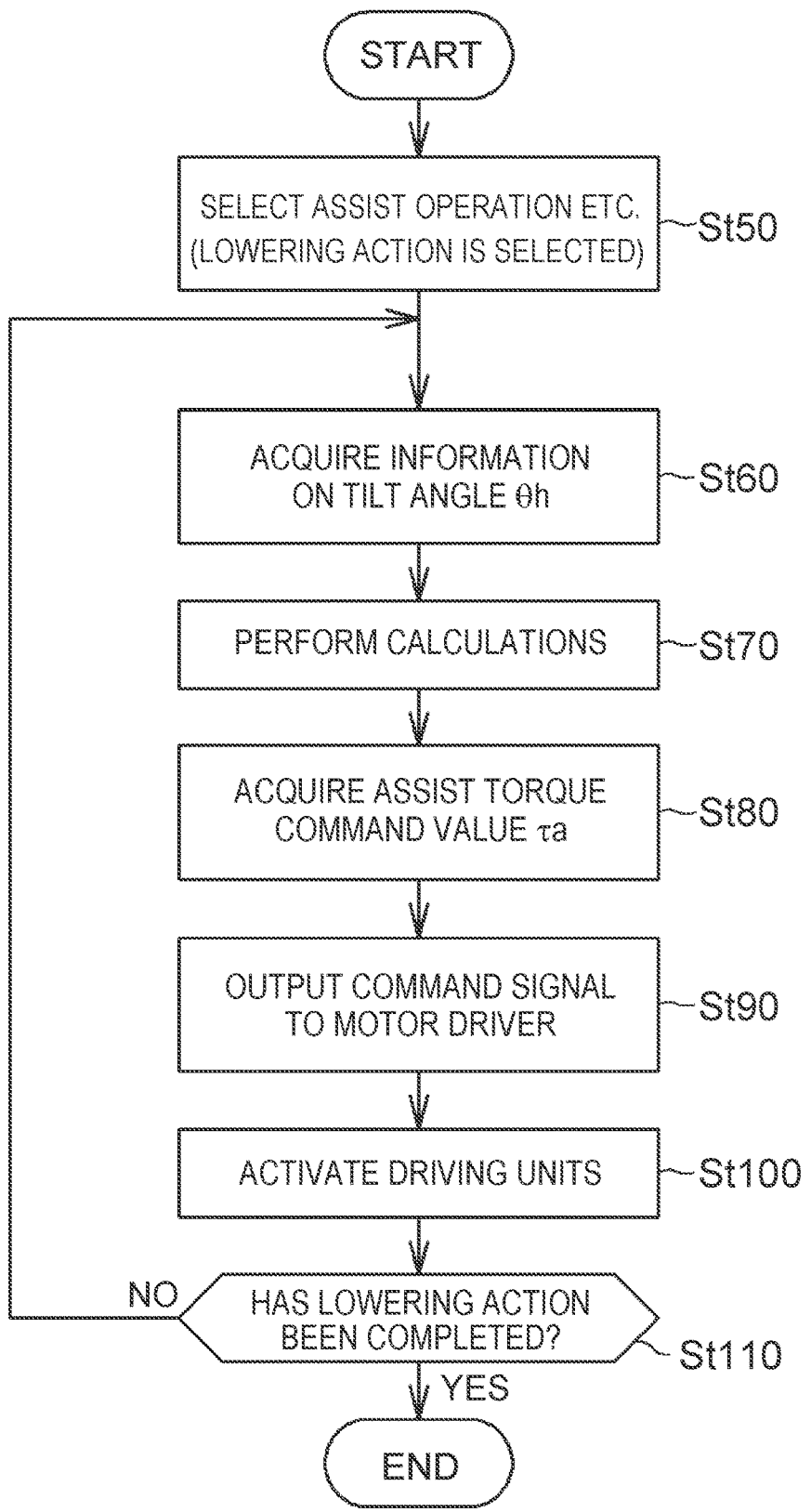
FIG. 9 is a flowchart showing one example of the lowering action process.

In the following, a specific example of the process of obtaining a command value for assist torque for a lowering action will be described. FIG. 8 is a block diagram showing part of a lowering action process performed by the processing unit 16, and FIG. 9 is a flowchart showing one example of this process. FIG. 8 shows a process of obtaining an assist torque command value $\tau a$. The lowering action process is performed when "lowering action" is selected in the operation unit 14 (step St50 of FIG. 9). Actions of the user for which the lowering action process is performed include an action in which the user leans his or her upper body forward without holding a load with hands (bowing action), in addition to an action in which the user holds a load with hands and leans his or her upper body forward to lower the load.

The lowering action process is a process of, when the user wearing the assist device 10 performs a lowering action, providing the user with assist torque. Also when the user performs a lowering action, assist torque generated by the assist device 10 is torque in the direction of changing the posture of the user from a forward leaning posture to an upright standing posture, i.e., torque in a lifting direction, as described above. When the user performs a lowering action, the assist device 10 generates assist torque as an assist force that slows down the action of the user leaning his or her upper body forward. Regarding the positive and negative signs of assist torque, the lifting direction and the lowering direction are defined as negative and positive, respectively, as shown in FIG. 4.

The entire lowering action process will be described (see FIG. 9). A process of acquiring the tilt angle $\theta h$ obtained by the triaxial acceleration sensor 33 (step St60) is performed. A process involving various calculations is performed by the calculation part 16a based on information on the tilt angle $\theta h$ (step St70), and the assist torque command value $\tau a$ is obtained based on the result of this process (step St80). A command signal for causing the driving units 13R, 13L to output assist torque corresponding to the command value $\tau a$ is provided to the motor driver 18 (step St90). The motor driver 18 activates the driving units 13R, 13L based on the command signal (step St100). Thus, assist torque is provided to the user. This cycle shown in FIG. 9, i.e., the sequence of processes shown in FIG. 9 is repeatedly performed in predetermined cycles (e.g., the sequence of processes is performed every 0.001 seconds) until the lowering action is completed (step St110). The lowering action process for the right driving unit 13R and the lowering action process for the left driving unit 13L are the same and concurrently performed.

A specific example of the process of obtaining the command value $\tau a$ will be described using FIG. 8. Based on a detection signal of the triaxial acceleration sensor 33, the calculation part 16a acquires the tilt angle $\theta h$ of the user (block B50 of FIG. 8 and step St60 of FIG. 9). The tilt angle $\theta h$ is stored in the storage device 17.

Using the acquired tilt angle $\theta h$, the calculation part 16a obtains a time-based change $\theta v$ in the tilt angle $\theta h$ (a time rate of change) (block B60 of FIG. 8 and step St70 of FIG. 9). Since the lowering action process is repeatedly performed in predetermined cycles as described above, the calculation part 16a can obtain the time-based change $\theta v$ in the tilt angle $\theta h$ from the following formula using a tilt angle θh(t−1) acquired in the last (directly preceding) lowering action process, a tilt angle θh(t) acquired in the current lowering action process, and a value t of the predetermined cycle.

$$\theta v = (\theta h(t) - \theta h(t-1))/t.$$

The time-based change θv in the tilt angle θh is stored in the storage device 17. The time-based change θv in the tilt angle θh can be said to be the moving speed of the upper body and the angular speed of the upper body in tilting. Hereinafter, the time-based change θv in the tilt angle θh may be referred to as an "angular speed θv."

Figure 10:
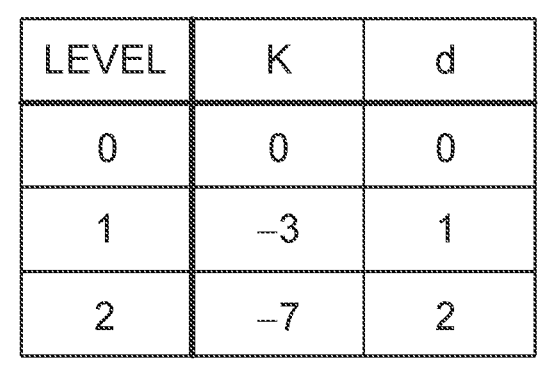

In the control device 15, a virtual spring constant K as a rigidity term gain and a damper constant d as a viscosity term gain are set. Information on the respective values of the virtual spring constant K and the damper constant d is stored in the storage device 17. The respective values of the virtual spring constant K and the damper constant d are preset values, and for example, each of these constants is set to a different value for each intensity level (level 1, 2, or 3) of assist operation for lowering as shown in FIG. 10.

As will be understood from the description below, the damper constant d is a constant for reducing the assist torque command value τa in the case of a lowering action, i.e., a constant for reducing the slow-down effect on the action of the user leaning his or her upper body forward. Therefore, the damper constant d can also be called an assistance moderation constant (assistance moderation term).

One of the values of each of the virtual spring constant K and the damper constant d is selected according to the set intensity (level 1, 2, or 3) of assist operation. The intensity of assist operation is set by the user through the operation unit 14 (selection button) at the start of an action. When "high (level 3)" is selected in setting the intensity of assist operation, a value that makes the assist torque command value τa larger is selected as the value of the virtual spring constant K than when "low (level 1 or 2)" is selected. While levels 1, 2, and 3 are illustrated as the setting of the intensity of assist operation, a larger number of levels (e.g., levels 0, 1, 2, 3, 4, and so on) may be provided.

The calculation part 16a multiplies the obtained tilt angle θh by the virtual spring constant K (block B51 of FIG. 8 and step St70 of FIG. 9). The process of performing this multiplication is a first process. In the case of this embodiment, the virtual spring constant K has a negative sign at levels 2 and 3. As described above, for assist torque, the lifting direction is defined as negative. In the first process, therefore, the assist torque command value in the negative direction is increased as the tilt angle θh increases. Thus, the first process to increase the assist force as the tilt angle θh becomes larger is performed.

As a process separate from the first process, the calculation part 16a multiplies the obtained angular speed θv of the upper body by the damper constant d (block B61 of FIG. 8 and step St70 of FIG. 9). The process of performing this multiplication is a second process. In the case of this embodiment, the damper constant d has a positive sign at levels 2 and 3. As described above, with regard to assist torque, the lifting direction is defined as negative. In the second process, therefore, the assist torque command value in the negative direction is reduced as the tilt angle θh increases. Thus, the second process to reduce the assist force as the angular speed θv of the upper body increases is performed. This second process can be called an "assistance moderation process" to reduce the assist force.

The calculation part 16a obtains the assist torque command value as the assist parameter for a lowering action based on the result of the first process and the result of the second process. Specifically, the calculation part 16a obtains a sum of a value obtained by multiplying the tilt angle θh by the virtual spring constant K and a value obtained by multiplying the angular speed θv by the damper constant d (block B70 of FIG. 8 and step St70 of FIG. 9), and sets the value of the sum as the assist torque command value τa for a lowering action (step St80 of FIG. 9).

Figure 11:
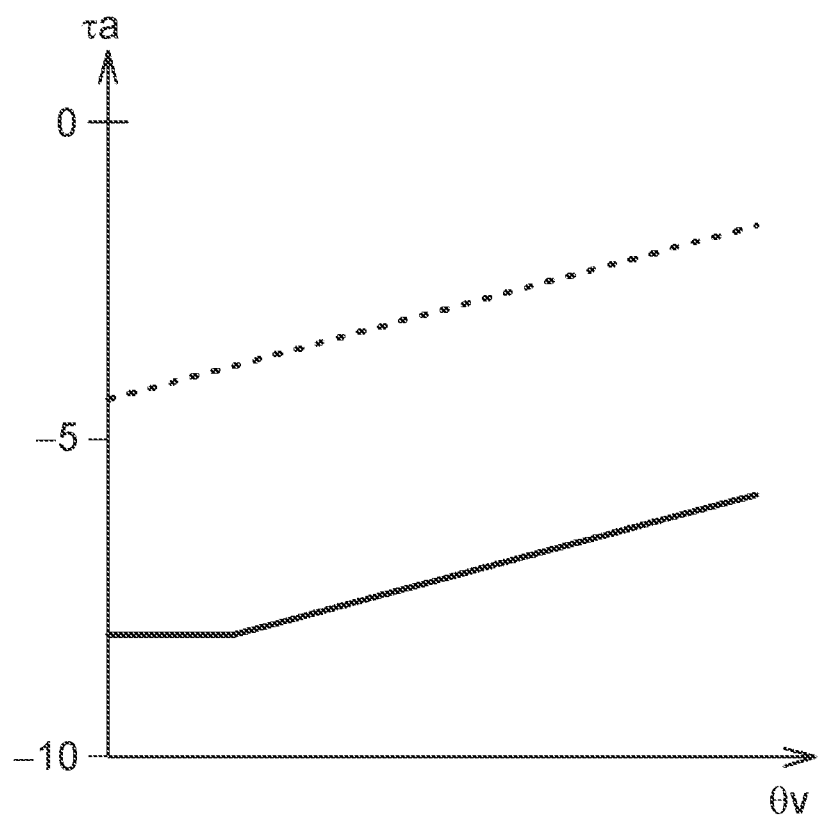
FIG. 11 is a graph illustrating an image of an assist torque command value.

FIG. 11 is a graph illustrating an image of the assist torque command value to obtained by the processing unit 16 (calculation part 16a). In the graph of FIG. 11, the ordinate and the abscissa show assist torque in the case of a lowering action and the angular speed θv of the upper body, respectively. In FIG. 11, a case where the tilt angle θh is 30 degrees is indicated by a broken line, and a case where the tilt angle θh is 60 degrees is indicated by a solid line. Regarding the positive and negative signs of assist torque, the lifting direction is negative and the lowering direction is positive. As shown in FIG. 11, regardless of the tilt angle θh, the assist torque command value τa approaches zero as the angular speed θv of the upper body increases. In other words, the slow-down effect on the action of the user leaning his or her upper body forward decreases as the angular speed θv increases.

As has been described, when the user performs an action of leaning his or her upper body forward, the processing unit 16 of the control device 15 obtains an assist torque command value for providing the user with an assist force in the direction of bringing the user to an upright standing posture based on the tilt angle θh of the upper body of the user and the angular speed θv of the upper body. In this embodiment, the processing unit 16 can perform the assistance moderation process (second process) to reduce the assist force (command value τa) as the angular speed θv increases.

The assist device 10 having the above configuration obtains the assist torque command value τa using the tilt angle θh of the upper body of the user. Thus, the assist device 10 can generate a larger assist force when the upper body leans forward to a large degree and the tilt angle θh is large than when the tilt angle θh is small. As a result, for example, the burden on the hips BW of the user can be relieved more effectively. Moreover, the assist torque command value τa is obtained using not only the tilt angle θh of the upper body of the user but also the angular speed θv that is the time-based change in the tilt angle. In particular, the process to reduce the assist force when the angular speed θv increases is performed. Thus, in the case where the user leans his or her upper body forward to a relatively large degree, temporarily stops this action, and then leans his or her upper body further forward, when the upper body starts to move, the assist force can be reduced according to the angular speed θv, and thus, the user can easily assume a posture of leaning further forward.

Figure 12:
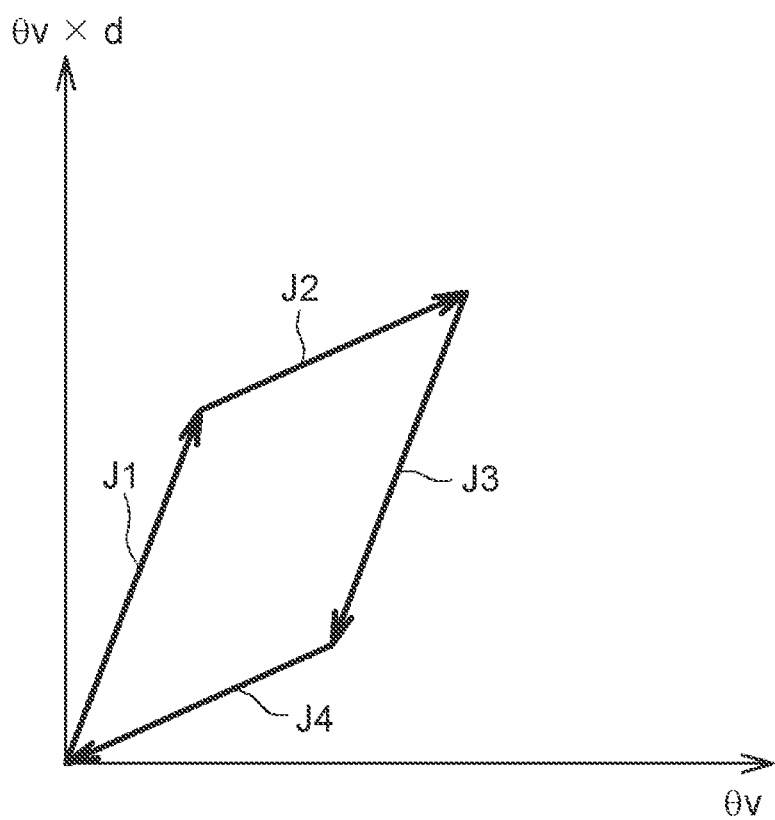
FIG. 12 is a chart illustrating a modified example of a second process.

FIG. 12 is a chart illustrating a modified example of the second process. The ordinate and the abscissa of the graph shown in FIG. 12 show "a value obtained by multiplying the angular speed θv by the damper constant d" and the angular speed θv, respectively. Since the processing unit 16 obtains the angular speed θv in the predetermined cycle, it can determine whether the angular speed θv is on the increase or the decrease at the current time point (in the current process). That is, when the user performs an action of leaning his or her upper body forward, the processing unit 16 can determine whether this action is an action involving acceleration or an action involving deceleration.

Even when the angular speed θv is the same, the damper constant d in the case of acceleration and the damper constant d in the case of deceleration are set to values different from each other. The processing unit 16 increases the rate of reducing the assist force when the forward leaning action of the user involves acceleration, as indicated by arrows J1 and J2 shown in FIG. 12. In contrast, when the forward leaning action of the user involves deceleration, the processing unit 16 reduces the rate of reducing the assist force, as indicated by arrows J3 and J4 shown in FIG. 12. Therefore, the damper constant d is a variable value, and a value of the damper constant d used in the case of acceleration and a value of the damper constant d used in the case of deceleration are different from each other. Thus, as the second process, the processing unit 16 performs a process of obtaining acceleration or deceleration of a forward leaning action of the user, and making the rate of reducing the assist force larger when acceleration is obtained than when deceleration is obtained.

In the case of this modified example, when the forward leaning action involves acceleration, for example, when the user quickly lowers a relatively light load, the rate of reducing the assist force in the direction of bringing the user to an upright standing posture is increased, and thus, the user can perform the forward leaning action more easily. In contrast, when the forward leaning action involves deceleration, for example, when the user slowly lowers a heavy load, the rate of reducing the assist force in the direction of bringing the user to an upright standing posture is reduced, and thus, an appropriate assist force can be provided to the user. When the user performs an action involving acceleration, for example, when the user starts to lower a relatively heavy load, the rate of reducing the assist force in the direction of bringing the user to an upright standing posture is increased, and thus, the user can perform the forward leaning action more easily. Further, when the user performs an action of lowering a load and is about to stop the action upon coming close to a target position (i.e., when the forward leaning action is decelerated), the rate of reducing the assist force in the direction of bringing the user to an upright standing posture is reduced, and thus, an appropriate assist force can be provided to the user.

Assist Device 10 in Second Form

Figure 13:
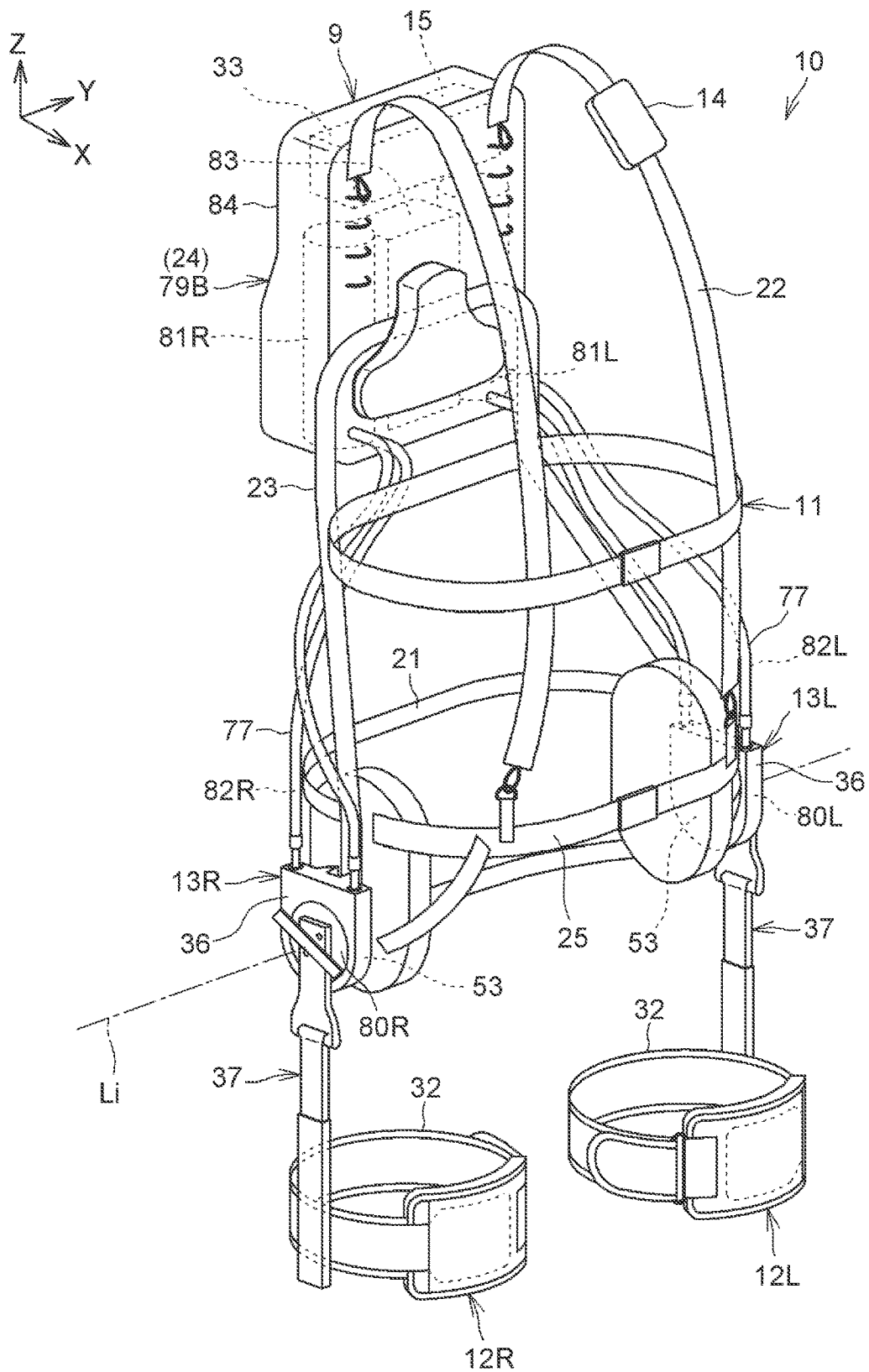
FIG. 13 is a perspective view showing an assist device in a second form.

FIG. 13 is a perspective view showing an assist device 10 in a second form. This assist device 10 includes a first body-worn unit 11 that is worn on the upper body of the user, right and left second body-worn units 12R, 12L that are worn on the thighs of the right and left legs of the user, and an actuator 9. Those components that have the same functions in the assist device 10 shown in FIG. 1 (first form) and the assist device 10 shown in FIG. 13 are denoted by the same reference signs.

In the second form, the actuator 9 includes a power unit 79B that corresponds to the backpack 24 in the first form, and a right driving unit 13R and a left driving unit 13L that are provided so as to be located on the right side and the left side of the hips of the user. The power unit 79B and each of the right and left driving units 13R, 13L are coupled together by a frame 23 that is made of metal or the like. The first body-worn unit 11 is mounted on the power unit 79B and the right and left driving units 13R, 13L.

The power unit 79B includes, inside a case 84, a motor 83 and right and left driving pulleys 81R, 81L that are driven to rotate by the motor 83. A triaxial acceleration sensor 33 is provided inside the power unit 79B as a detection part that detects the tilt angle of the upper body of the user. The left driving unit 13L is provided with a driven pulley 80L inside a case 36. The right driving unit 13R is provided with a driven pulley 80R inside a case 36. Each of the right and left driven pulleys 80R, 80L is provided inside the case 36 so as to be able to turn in one direction and the other direction around an imaginary line Li that passes through the user at a position near his or her hips in the right-left direction. On the left side, a wire 82L is wrapped around the driving pulley 81L and the driven pulley 80L, and on the right side, a wire 82R is wrapped around the driving pulley 81R and the driven pulley 80R. The wires 82R, 82L are respectively housed in guide pipes 77 that are provided between the power unit 79B and the right and left cases 36.

When the right and left driving pulleys 81R, 81L are turned in the one direction by the motor 83, the right and left driven pulleys 80R, 80L are turned in the one direction, with the wires 82R, 82L functioning as power transmission members. When the driving pulleys 81R, 81L are turned in the other direction by the motor 83, the driven pulleys 80R, 80L are turned in the other direction, with the wires 82R, 82L functioning as power transmission members. Arms 37 are respectively mounted on the driven pulleys 80R, 80L, and each of the driven pulleys 80R, 80L moves integrally with the arm 37. The second body-worn units 12R, 12L are mounted at lower parts of the arms 37.

Torque of the right and left arms 37 swinging around the imaginary line Li as a result of turning of the driven pulleys 80R, 80L is provided to the user as assist torque. Each of the right driving unit 13R and the left driving unit 13L can operate independently of each other and perform different operations, as well as can synchronously perform the same operation. Thus, the actuator 9 can perform assist operation of providing the user with an assist force through the first body-worn unit 11 and the second body-worn units 12R, 12L.

Also in the second form, the assist device 10 includes sensors 53 that obtain the swing angles of the arms 37 representing the angles formed by the upper body and the thighs of the user. The sensors 53 function to detect the rotation angles of the driven pulleys 80R, 80L that move integrally with the arms 37, and are, for example, encoders or angle sensors. The sensors 53 have the same function as the second detectors 52 in the first form. Since the rotation angle of the driven pulley 80L (80R) and the rotation angle of the driving pulley 81L (81R) are correlated with each other, a sensor that detects the swing angle of the arm 37 based on the rotation angle of the driving pulley 81L (81R) may be used as the detector that obtains the swing angle of the arm 37.

Also in the second form, as in the first form, the assist device 10 includes a control device 15 that performs a lowering action process. The control device 15 (see FIG. 7) includes a processing unit (processing device) 16 including a central processing unit (CPU), a storage device 17 formed by a non-volatile memory or the like that stores information, such as various programs and databases, a motor driver 18 that controls the motor 83, etc. As in the first form, the processing unit 16 detects the tilt angle $\theta h$ of the upper body of the user and obtains the time-based change $\theta v$ in the tilt angle $\theta h$ (angular speed $\theta v$) of the upper body of the user by calculations using the tilt angle $\theta h$, as shown in FIG. 8.

As in the first form (see FIG. 8), the processing unit 16 performs a first process to increase the assist force as the tilt angle $\theta h$ of the upper body of the user increases. Further, the processing unit 16 performs a second process to reduce the assist force as the time-based change $\theta v$ in the tilt angle $\theta h$ (angular speed $\theta v$) becomes larger (higher). The processing unit 16 obtains an assist torque command value Ta as the assist parameter based on the result of the first process and the result of the second process. The motor 83 is operated at an output corresponding to the command value τa. Specific examples of these processes are the same as those of the processes shown in FIG. 8 to FIG. 12, and therefore the description thereof will be omitted here.

Like the assist device 10 in the first form, the assist device 10 in the second form performs assist operation using the arms 37 by operating the right and left driving units 13R, 13L. This assist operation is operation of providing assist torque around an imaginary line Li to the user through the first body-worn unit 11 and the second body-worn units 12R, 12L. The imaginary line Li passes through the user at a position near his or her hips BW in a right-left direction. The second form and the first form are the same also in this respect.

The assist torque command value τa obtained by the processing unit 16 is the value of torque that swings the arm 37 around the imaginary line Li. This torque is generated by the motor 83 of the actuator 9. Thus, torque output by the driving units 13R, 13L with the use of torque of the motor 83 is "assist torque" provided by the assist device 10.

Also in the second form, the processing unit 16 may be configured to perform, as the second process, a process of obtaining acceleration or deceleration of a forward leaning action of the user, and making the rate of reducing the assist force larger when acceleration is obtained than when deceleration is obtained, as described with FIG. 12.

As has been described, the actuator 9 of each of the assist device 10 shown in FIG. 1 (first form) and the assist device 10 shown in FIG. 13 (second form) is configured as follows. The actuator 9 includes the right and left driving units 13R, 13L that are mounted on the first body-worn unit 11 so as to be located on the right and left sides of the hips BW of the user, and the right and left arms 37. The right and left arms 37 have their leading ends mounted on the second body-worn units 12R, 12L, respectively, that are worn on the thighs BF of the legs of the user, and have their base ends mounted on the driving units 13R, 13L, respectively. Each of the right and left arms 37 swings back and forth around the base end.

The actuator 9 is configured to, when the user changes the posture of his or her upper body in a forward leaning direction, provide the user with an assist force (assist torque) in the direction opposite to the forward leaning direction by generating torque on each of the right and left arms 37 around the base end. For example, when the user lowers a load, i.e., when the user places a load that the user is holding with hands onto a floor etc., the user changes his or her posture from an upright standing posture to a forward leaning posture. The assist device 10 having this configuration can generate an assist force in the direction of bringing the upper body that is in a forward leaning posture to an upright standing posture. Thus, the assist device can generate such an assist force that slows down the action of the user leaning his or her upper body forward.

Modified Examples of First Process and Second Process

As described above, the assist device 10 in the second form (first form) includes the sensors 53 (second detectors 52) provided on the driving units 13R, 13L, in addition to the triaxial acceleration sensor 33 provided in the power unit 79B (backpack 24), as means for detecting the tilt angle of the upper body. The acceleration sensor 33 detects the tilt angle θh with respect to the vertical line V (see FIG. 4). The sensors 53 (second detectors 52) detect the tilt angle θL of the upper body of the user with respect to the thighs BF of the user. Since the tilt angle θh (θL) is detected on a moment-to-moment basis, the processing unit 16 can obtain the time-based change θv in the tilt angle θh (θL) (angular speed θv) of the upper body of the user based on the tilt angle θh (θL).

Figure 14:
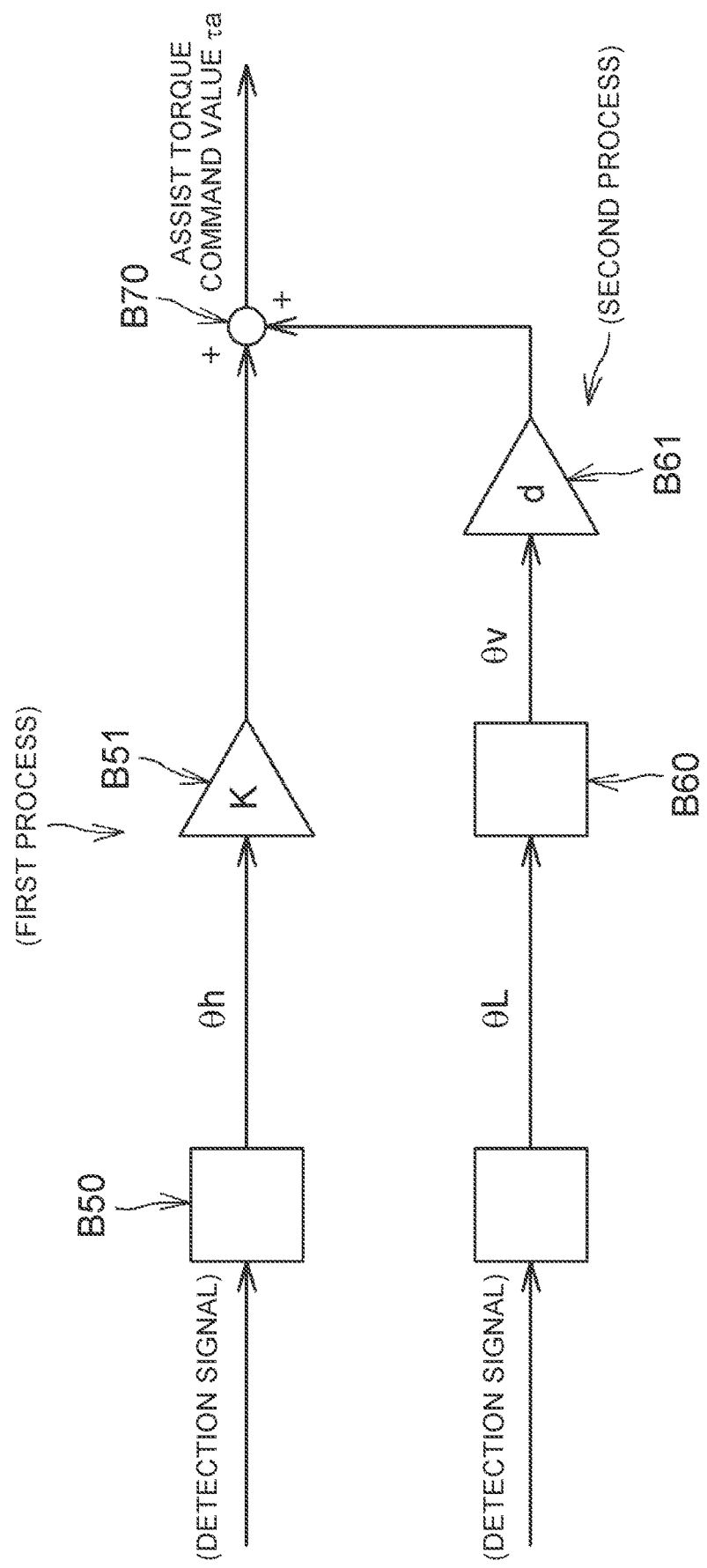
FIG. 14 is a block diagram showing a modified example of the process shown in FIG. 8.

As shown in FIG. 14, the tilt angle θh used in the first process may be a value obtained by the triaxial acceleration sensor 33, and the angular speed θv used in the second process may be a value obtained by the sensors 53 (second detectors 52). FIG. 14 is a block diagram showing a modified example of the process shown in FIG. 8. Thus, when the user performs a forward leaning action, the processing unit 16 may obtain an assist torque command value τa for providing the user with an assist force in the direction of bringing the user to an upright standing posture based on the tilt angle θh obtained by the triaxial acceleration sensor 33 and the angular speed θv obtained by the sensors 53 (second detectors 52).

Assist Device 10 of Third Form

Figure 15:
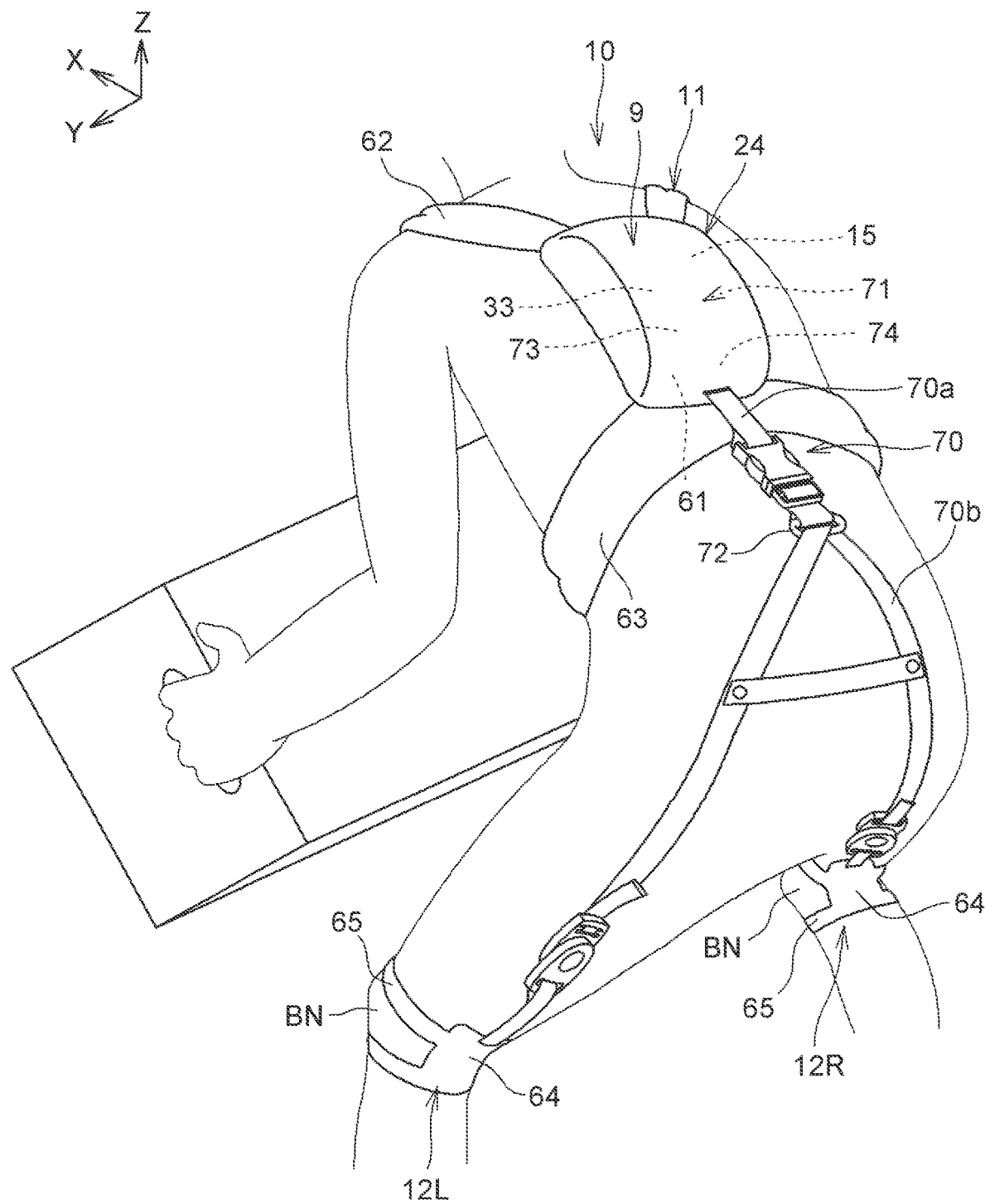
FIG. 15 is a perspective view showing an assist device in a third form.

FIG. 15 is a perspective view showing an assist device 10 in a third form (in a state of being worn by the user). This assist device 10 includes a first body-worn unit 11 that is worn on the upper body of the user, right and left second body-worn units 12R, 12L that are worn on the right and left legs of the user, an actuator 9 that provides the user with an assist force through the first body-worn unit 11 and the second body-worn units 12R, 12L, and a triaxial acceleration sensor 33 as a detection part that detects the tilt angle of the upper body of the user. In this respect, this assist device 10 is the same as the assist device 10 according to the first form. In the third form shown in FIG. 15, the second body-worn units 12R, 12L are worn on the knees of the legs.

The first body-worn unit 11 is made of a flexible fabric or the like. The first body-worn unit 11 includes a back main part 61 that is worn on the back of the user, and shoulder belts 62 and a hip belt 63 that are connected to the back main part 61. The back main part 61 is carried on the back of the user. The lengths of the shoulder belts 62 and the hip belt 63 are adjustable, and these lengths are adjusted so as to bring the back main part 61 into close contact with the back of the user. The first body-worn unit 11 is worn so as to be unable to move in front-rear, right-left, and up-down directions relatively to the upper body of the user.

The shapes of the right and left second body-worn units 12R, 12L are mirror images of each other, but these units have the same configuration. Each of the right and left second body-worn units 12R, 12L is made of a flexible fabric or the like. Each of the second body-worn units 12R, 12L includes a knee main part 64 that is worn on the back side of the knee BN of the user, and a knee belt 65 that is provided so as to extend from the knee main part 64. The knee belt 65 surrounds the knee BN and is fixed to the knee main part 64 with a touch-and-close fastener (hook-and-loop fastener) or the like. The fixing positions of the knee belts 65 are adjusted so as to bring the second body-worn units 12R, 12L into close contact with the knees BN. Each of the second body-worn units 12R, 12L is worn so as to be unable to move in the front-rear, right-left, and up-down directions relatively to the knee BN.

The actuator 9 includes a belt body 70 that is provided to extend along the back side of the user so as to connect the first body-worn unit 11 to each of the second body-worn units 12R, 12L, and a reeling unit 71 that can reel and unreel (i.e., reel out) a part of the belt body 70. The belt body 70 includes a first belt part 70a that corresponds to the upper body side of the user, a second belt part 70b that corresponds to the lower body side of the user, and a coupling member 72 that couples the first belt part 70a and the second belt part 70b together. Each of the first belt part 70a and the second belt part 70b is elongated and flexible.

Figure 16:
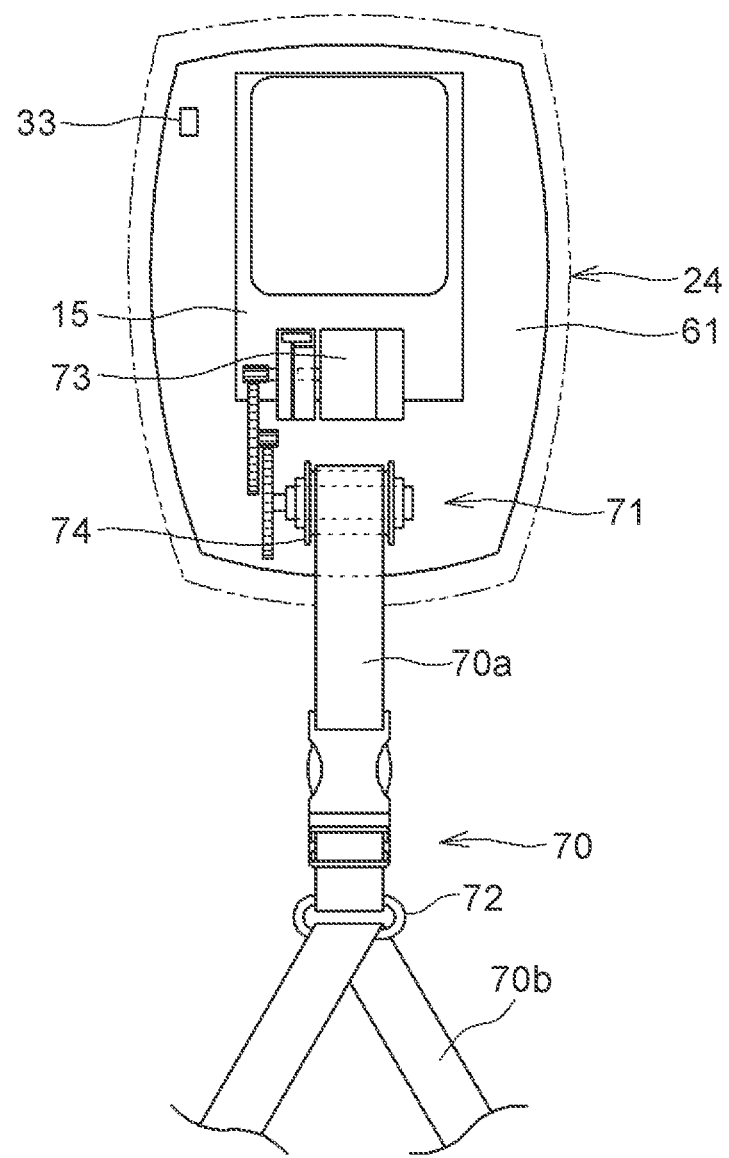
FIG. 16 is an illustration of a reeling unit.

The reeling unit 71 is provided inside a backpack 24 that is mounted on the first body-worn unit 11 (back main part 61). FIG. 16 is a view illustrating the reeling unit 71. The reeling unit 71 includes a motor 73, and a drum 74 that can be rotated by the motor 73 and reels the belt body 70. As the reeling unit 71 reels the belt body 70, a tensile force is exerted on the belt body 70. This tensile force provides an assist force that assists the user in a task, and relieves the burden on the body of the user. For example, when the user changes his or her posture from a forward leaning posture to an upright standing posture while supporting a load with hands (holding a load with hands), the reeling unit 71 reels the belt body 70 to exert a tensile force on the belt body 70. This tensile force helps the user change his or her posture from a forward leaning posture to an upright standing posture, and relieves the burden on the body of the user.

When the user changes his or her posture from an upright standing posture to a forward leaning posture, i.e., when the user performs a lowering action, the reeling unit 71 operates so as to reel out the belt body 70 from the drum 74 while generating torque in the direction in which the belt body 70 is reeled onto the drum 74. When the user performs a lowering action, the reeling unit 71 generates such an assist force that slows down the action of the user leaning his or her upper body forward. This assist force is based on the tensile force on the belt body 70 that the drum 74 tries to reel, and this assist force relieves the burden on the body of the user in a lowering action. When the user stops in a forward leaning posture, this posture is maintained by the tensile force on the belt body 70 to relieve the burden on the body of the user. The actuator 9 including the belt body 70 and the reeling unit 71 as has been described can perform assist operation of providing the user with an assist force through the first body-worn unit 11 and the second body-worn units 12R, 12L.

As in the first form, the assist device 10 according to the third form includes a control device 15 that performs a lowering action process. The control device 15 (see FIG. 7) includes a processing unit (processing device) 16 including a central processing unit (CPU), a storage device 17 formed by a non-volatile memory or the like that stores information, such as various programs and databases, a motor driver 18 that controls the motor 73, etc. As in the first form, the processing unit 16 detects the tilt angle θh of the upper body of the user and obtains the time-based change θv in the tilt angle θh (angular speed θv) of the upper body of the user from the detected tilt angle θh, as shown in FIG. 8.

As in the first form (see FIG. 8), the processing unit 16 performs a first process to increase the assist force as the tilt angle θh of the upper body of the user increases. Further, the processing unit 16 performs a second process to reduce the assist force as the time-based change θv in the tilt angle θh (angular speed θv) increases. The processing unit 16 obtains an assist torque command value τa as the assist parameter based on the result of the first process and the result of the second process. The motor 73 is operated at an output corresponding to the command value τa. Specific examples of these processes are the same as those of the processes shown in FIG. 8 to FIG. 12, and therefore the description thereof will be omitted here.

The assist device 10 in the third form performs assist operation by the reeling unit 71 reeling the belt body 70 both when the user performs a lifting action and when the user performs a lowering action. This assist operation is operation of providing a tensile force, which is exerted on the belt body 70, to the user through the first body-worn unit 11 and the second body-worn units 12R, 12L when the reeling unit 71 reels the belt body 70.

The assist torque command value τa obtained by the processing unit 16 is the value of torque by which the reeling unit 71 (drum 74) reels the belt body 70. This torque is generated by the motor 73 of the reeling unit 71. Thus, the torque output by the reeling unit 71 using torque of the motor 73 is "assist torque" provided by the assist device 10.

Also in the third form, the processing unit 16 may be configured to perform, as the second process, a process of obtaining acceleration or deceleration of a forward leaning action of the user and making the rate of reducing the assist force larger when acceleration is obtained than when deceleration is obtained, as described with FIG. 12.

As has been described, the actuator 9 of the assist device 10 shown in FIG. 15 and FIG. 16 (third form) is configured as follows. The actuator 9 includes the reeling unit 71 including the drum 74 and the motor 73 that rotates the drum 74 and mounted on the first body-worn unit 11, and the belt body 70. The belt body 70 has a first end wound around the drum 74 and second ends mounted on the second body-worn units 12R, 12L. The motor 73 generates torque in the direction in which the drum 74 reels a part of the belt body 70.

For example, when the user lowers a load, i.e., when the user places a load that the user is holding with hands onto a floor etc., the user changes his or her posture from an upright standing posture to a forward leaning posture. The assist device 10 having this configuration can generate an assist force in the direction of bringing the upper body that is in a forward leaning posture to an upright standing posture. In other words, the assist device can generate such an assist force that slows down the action of the user leaning his or her upper body forward.

Assist Devices 10 of Respective Forms

In the assist devices 10 in the respective first, second, and third forms, the control device 15 obtains the assist torque command value τa for causing the actuator 9 to generate a desired assist force, and performs control for causing the actuator 9 to operate at an output corresponding to the command value τa. When the user performs an action of leaning his or her upper body forward, the control device 15 obtains the command value τa for providing the user with an assist force in the direction of bringing the user to an upright standing posture based on the tilt angle θh of the upper body of the user and the time-based change θv in the tilt angle θh. Further, the control device 15 can perform the assist moderation process to reduce the assist force when the time-based change θv increases.

These assist devices 10 in the respective forms obtain the assist torque command value τa using the tilt angle θh of the upper body of the user. When the upper body leans forward to a large degree and the tilt angle θh is large, the assist devices 10 generate a large assist force. Thus, for example, the burden on the hips of the user can be relieved more effectively. Further, the assist torque command value τa is obtained using not only the tilt angle θh of the upper body of the user but also the time-based change θv in the tilt angle θh (angular speed θv). In particular, when the time-based change θv in the tilt angle θh increases, the process to reduce the assist force is performed. Thus, in the case where the user leans his or her upper body forward to a relatively large degree, temporarily stops this action, and then leans his or her upper body further forward, when the upper body starts to move, the assist force can be reduced according to the time-based change θv in the tilt angle θh, and thus, the user can easily assume a posture of leaning further forward.

In the assist devices 10 in the first, second, and third forms, for example, when the user performs an action of lowering a load, the assist force increases as the tilt angle θh of the upper body increases. When the user stops in a forward leaning posture at a predetermined tilt angle θh, the time-based change θv in the tilt angle θh becomes zero and this forward leaning posture is maintained by a relatively large assist force, and thus, the burden on the user is relieved. When the user starts an action of leaning further forward and the time-based change θv in the tilt angle θh increases, the assist torque command value τa in the direction of reducing the assist force is obtained. Thus, the user can easily assume a forward leaning posture.

As has been described, the assist device 10 in each of the forms described above can achieve both of increasing the assist force as the tilt angle θh of the upper body of the user increases when the user performs an action of leaning his or her upper body forward, and allowing the user to move easily when the user performs an action of leaning further forward from that state. Moreover, when the user relatively quickly performs an action of leaning forward and the time-based change θv in the tilt angle θh increases, the control device 15 obtains the assist torque command value τa in the direction of reducing the assist force. Thus, the user can easily assume a forward leaning posture.

The mechanisms of the respective parts of the assist device 10 in each of the forms described above may have configurations different from those shown in the drawings. For example, the first body-worn unit 11 may have a form different from that shown in the drawings, as long as it is configured to be worn on the upper body of the user. The second body-worn units 12R, 12L may have forms different from those shown in the drawings, as long as they are configured to be worn on the right and left legs of the user. In the forms shown in FIG. 1 and FIG. 13, the configuration of the actuator 9 may also be different, as long as it includes the arms 37 that provide the user with assist torque by swinging back and forth. In the form shown in FIG. 15, the configuration of the actuator 9 may be different, as long as it is configured to reel the belt body 70.

In the forms described above, the case where the detection part that detects the tilt angle (θh) of the upper body is the triaxial acceleration sensor 33 has been described. However, the detection part may be any other sensor configured to produce the output that varies according to the posture of the upper body of the user. In the forms described above, the processing unit 16 obtains the assist parameter for assist operation as a torque value (assist torque). However, the assist parameter may be a parameter other than a torque value, and may be, for example, a load (force).

The embodiment disclosed above is in every respect merely illustrative and not restrictive. The scope of the right for the disclosure is not limited to the above embodiment but includes all changes within a scope equivalent to the configuration described in the claims.

What is claimed is:

1. An assist device comprising:
   a first body-worn unit that is worn on an upper body of a user;
   right and left second body-worn units that are worn on right and left legs of the user;
   an actuator configured to provide the user with an assist force through the first body-worn unit and the second body-worn units;
   a detection part configured to detect a tilt angle of the upper body of the user; and
   a controller configured to obtain an assist parameter for causing the actuator to generate a desired assist force, and perform control for causing the actuator to operate at an output corresponding to the assist parameter, wherein:
   when the user performs a forward leaning action that is a forward leaning action in which the user leans his or her upper body forward, the controller obtains the assist parameter for providing the user with the assist force in a direction of bringing the user to an upright standing posture based on the tilt angle and a time-based change in the tilt angle; and
   the controller is configured to further perform an assistance moderation process to reduce the assist force when the time-based change in the tilt angle increases,
   the controller is configured to obtain the assist parameter for providing the user with the assist force in the direction of bringing the user to an upright standing posture by
      obtaining an intensity level of assist operation from the user,
      acquiring the tilt angle and calculate the time-based change in the tilt angle,
      obtaining a first value by multiplying the tilt angle by a virtual spring constant,
      obtaining a second value by multiplying the time-based change in the tilt angle by a damper constant, the virtual spring constant and the damper constant being predetermined and based on the intensity level of assist operation, and
      obtaining the assist parameter based on the first value and the second value,
   a sign of the damper constant is positive when the intensity level of assist operation is greater than or equal to the predetermined intensity level, and an absolute value of the damper constant increases as the intensity level of assist operation increases, and
   the direction of bringing the user to the upright standing posture is defined as negative such that the assist force is increased when the tilt angle increases and the assist force is reduced when the time-based change in the tilt angle increases.

2. The assist device according to claim 1, wherein the controller is configured to
   obtain acceleration or deceleration of the forward leaning action of the user, and
   set the damper constant based on whether the user is accelerating or decelerating such that a rate of reducing the assist force larger when the acceleration is obtained than when the deceleration is obtained.

3. The assist device according to claim 1, wherein:
   the actuator includes
      driving units that are mounted on the first body-worn unit so as to be located on right and left sides of hips of the user, and
      arms each of which has a leading end mounted on a corresponding one of the second body-worn units that are worn on thighs of the legs of the user and has a base end mounted on a corresponding one of the driving units, each of the arms being configured to swing back and forth around the base end; and
   the actuator is configured to, when the user changes a posture of the upper body in a forward leaning direction, provide the user with the assist force in a direction opposite to the forward leaning direction by generating torque on the arms around the base ends.

4. The assist device according to claim 1, wherein:
the actuator includes
- a reeling unit including a drum and a motor that rotates the drum, the reeling unit being mounted on the first body-worn unit, and
- a belt body that has a first end wound around the drum and second ends mounted on the second body-worn units;

the actuator is configured to generate, by the motor, torque in a direction in which the drum reels a part of the belt body; and the actuator is configured to, when the user changes a posture of the upper body in a forward leaning direction, reel out the belt body from the drum while generating the torque in the direction in which the belt body is reeled onto the drum.

5. The assist device according to claim 1, wherein:
the controller is configured to obtain the assist parameter by adding the first value and the second value, and
a sign of the virtual spring constant is negative when the intensity level of assist operation is greater than or equal to a predetermined intensity level, and an absolute value of the virtual spring constant increases as the intensity level of assist operation increases.

6. The assist device according to claim 5, wherein the virtual spring constant and the damper constant are set such that the assist parameter as the time-based change in the tilt angle increases irrespective of the tilt angle.

* * * * *